US012619325B2

(12) United States Patent
Lee et al.

(10) Patent No.: US 12,619,325 B2
(45) Date of Patent: May 5, 2026

(54) DISPLAY DEVICE INCLUDING A TOUCH ELECTRODE

(71) Applicant: SAMSUNG DISPLAY CO., LTD.,
Yongin-si (KR)

(72) Inventors: Yu Jin Lee, Suwon-si (KR); Hee Rim Song, Seoul (KR); Cheol Gon Lee, Suwon-si (KR); Mu Kyung Jeon, Ulsan (KR)

(73) Assignee: SAMSUNG DISPLAY CO., LTD.,
Yongin-si (KR)

( * ) Notice: Subject to any disclaimer, the term of this patent is extended or adjusted under 35 U.S.C. 154(b) by 0 days.

(21) Appl. No.: 18/156,370

(22) Filed: Jan. 18, 2023

(65) Prior Publication Data

US 2023/0315224 A1      Oct. 5, 2023

(30) Foreign Application Priority Data

Apr. 5, 2022    (KR) ........................ 10-2022-0041994

(51) Int. Cl.
*G06F 3/041* (2006.01)
*G06F 3/042* (2006.01)

(52) U.S. Cl.
CPC .......... *G06F 3/0412* (2013.01); *G06F 3/0416* (2013.01); *G06F 3/0421* (2013.01); *G06F 2203/04112* (2013.01)

(58) Field of Classification Search
None
See application file for complete search history.

(56) References Cited

U.S. PATENT DOCUMENTS

| | | | |
|---|---|---|---|
| 10,541,281 B2 | 1/2020 | Han et al. | |
| 2016/0202814 A1 | 7/2016 | Lee et al. | |
| 2018/0190723 A1 * | 7/2018 | Han | G06F 3/0412 |
| 2020/0159353 A1 * | 5/2020 | Xie | G06F 3/0448 |
| 2021/0397806 A1 * | 12/2021 | Lu | G06V 10/143 |
| 2022/0067340 A1 * | 3/2022 | Han | G06V 40/1365 |
| 2022/0214758 A1 * | 7/2022 | Cheng | G06F 3/042 |
| 2022/0271098 A1 * | 8/2022 | Xu | H10K 59/65 |
| 2023/0104772 A1 | 4/2023 | Kim et al. | |

FOREIGN PATENT DOCUMENTS

| | | |
|---|---|---|
| CN | 111736726 | 10/2020 |
| KR | 10-2010-0007717 | 1/2010 |
| KR | 10-2018-0079025 A | 7/2018 |

* cited by examiner

*Primary Examiner* — Christopher R Lamb
(74) *Attorney, Agent, or Firm* — F. CHAU & ASSOCIATES, LLC

(57) ABSTRACT

A display device includes a substrate; a plurality of light emitting units disposed on the substrate; a plurality of light sensing units disposed on the substrate; a pixel defining layer partitioning the plurality of light emitting units and the plurality of light sensing units; and a touch electrode disposed on the pixel defining layer. A shape of a mesh hole defined by the touch electrode and in which the plurality of light sensing units are disposed is defined by the touch electrode, and is different from a shape of a mesh hole in which a first light emitting unit among the plurality of light emitting units is disposed.

21 Claims, 19 Drawing Sheets

EMA: EMA1, EMA2, EMA3, EMA4
MP: 410, 420, 430, 440

EMA: EMA1, EMA2, EMA3, EMA4
MP: 410, 420, 430, 440

EMA: EMA1, EMA2, EMA3, EMA4
MP: 410, 420, 430, 440

EMA: EMA1, EMA2, EMA3, EMA4
MP: 410, 420, 430, 440

EMA: EMA1, EMA2, EMA3, EMA4
MP: 410, 420, 430, 440

EMA: EMA1, EMA2, EMA3, EMA4
MP: 410, 420, 430, 440
410: 411, 412
420: 421, 422

EMA: EMA1, EMA2, EMA3, EMA4
MP: 410, 420, 430, 440

EMA: EMA1, EMA2, EMA3, EMA4
MP: 410, 420, 430, 440
410: 411, 412
420: 421, 422

DISPLAY DEVICE INCLUDING A TOUCH ELECTRODE

CROSS-REFERENCE TO RELATED APPLICATION

This application claims priority under 35 U.S.C. § 119 to Korean Patent Application No. 10-2022-0041994, filed on Apr. 5, 2022, in the Korean Intellectual Property Office, the contents of which are herein incorporated by reference in its entirety.

TECHNICAL FIELD

The present disclosure relates to a display device and, more specifically, to a display device including a touch electrode.

DISCUSSION OF THE RELATED ART

Display devices are employed in various electronic devices such as smartphones, digital cameras, laptop computers, navigation devices, smart watches and smart televisions. The display device may be a flat panel display device such as a liquid crystal display device, a field emission display device, and an organic light emitting display device.

Optical sensors for touch recognition or fingerprint recognition may be incorporated into the display panels of display devices.

In addition, the display panel may include a touch member for recognizing a touch input.

The touch member determines whether a user's touch input is made by using a plurality of touch electrodes, and calculates a corresponding position as touch input coordinates.

SUMMARY

A display device includes a substrate; a plurality of light emitting units disposed on the substrate; a plurality of light sensing units disposed on the substrate; a pixel defining layer partitioning the plurality of light emitting units and the plurality of light sensing units; and a touch electrode disposed on the pixel defining layer. A shape of a mesh hole defined by the touch electrode and in which the plurality of light sensing units are disposed is defined by the touch electrode, and is different from a shape of a mesh hole in which a first light emitting unit among the plurality of light emitting units is disposed.

A display device includes a substrate; a plurality of light emitting units disposed on the substrate; a plurality of light sensing units disposed on the substrate; a pixel defining layer partitioning the plurality of light emitting units and the plurality of light sensing units; and a touch electrode disposed on the pixel defining layer. The touch electrode includes first electrode lines extending in a first direction, second electrode lines extending in a second direction intersecting the first direction, third electrode lines extending in a first diagonal direction inclined with respect to the first direction, and fourth electrode lines extending in a second diagonal direction intersecting the first diagonal direction.

A display device includes a substrate; a plurality of light emitting units disposed on the substrate; a plurality of light sensing units disposed on the substrate; a pixel defining layer partitioning the plurality of light emitting units and the plurality of light sensing units; and a plurality of first sensor portions disposed on the pixel defining layer and extending in one direction and a contact area configured to connect the plurality of first sensor portions. The plurality of first sensor portions includes a first electrode line disposed outside any one of the plurality of light sensing units and a second electrode line intersecting the first electrode line. The contact area is not disposed on the first electrode line and the second electrode line.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION OF THE EMBODIMENTS

Embodiments of the present disclosure will now be described more fully hereinafter with reference to the accompanying drawings. This invention may, however, be embodied in different forms and should not necessarily be construed as limited to the embodiments set forth herein. Rather, these embodiments are provided so that this disclosure will be thorough and complete, and will filly convey the scope of the invention to those skilled in the art. The same reference numbers may indicate the same components throughout the specification and the drawings. The attached figures are intended to be drawn to scall to show at least one particular embodiment of the present disclosure and so the relative sizes, angles, arrangements, etc. shown in the figures may be considered part of the disclosure, however, various changes may be made to the illustrated embodiments without departing from the spirit and scope of the present disclosure.

It will also be understood that when a layer or an element is referred to as being "on" another layer or substrate, it can be directly on the other layer or substrate, or intervening layers may also be present. In contrast, when an element is referred to as being "directly on" another element, there are no intervening elements present.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Hereinafter, embodiments of the present disclosure will be described in detail with reference to the accompanying drawings.

Figure 1:
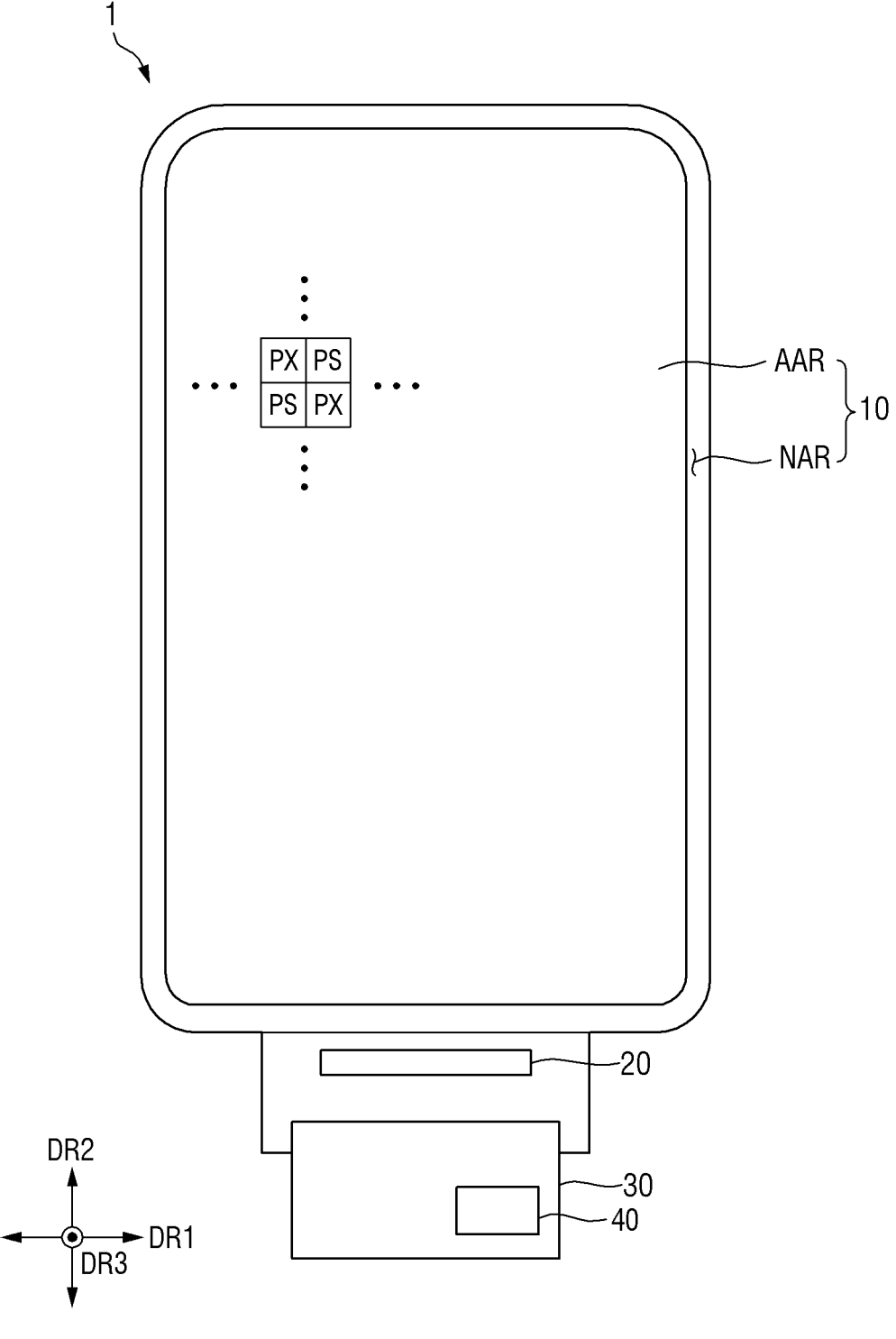
FIG. 1 is a plan view illustrating a display device according to an embodiment of the present disclosure.

FIG. 1 is a plan view illustrating a display device according to an embodiment of the present disclosure.

FIG. 1, a first direction DR1, a second direction DR2, and a third direction DR3 are indicated. The first direction DR1 may be a direction parallel to one side of a display device 1 in plan view and may be, for example, a horizontal direction of the display device 1. The second direction DR2 may be a direction parallel to the other side in contact with one side of the display device 1 in plan view and may be, for example, a vertical direction of the display device 1.

Hereinafter, for simplicity of description, it is assumed that one side of the first direction DR1 refers to a rightward direction in plan view, the other side of the first direction DR1 refers to a leftward direction in plan view, one side of the second direction DR2 refers an upward direction in plan view, and the other side of the second direction DR2 refers to a downward direction in plan view, respectively. The third direction DR3 may be a thickness direction of the display device 1 and may extend out of the page, in the plan view shown. It should be understood, however, that a direction mentioned in the embodiment refers to a relative direction and the embodiment is not necessarily limited to the direction mentioned.

Unless otherwise defined, with respect to the third direction DR3, the terms "above," and "top surface" as used herein refer to a display surface's side of a display panel 10, and the terms "below," "bottom surface," and "rear surface" as used herein refer to a side opposite to the display surface of the display panel 10.

Referring to FIG. 1, the display device 1 may include various electronic devices that provide a display screen. Examples of the display device 1 may include, but are not necessarily limited to including, a mobile phone, a smart phone, a tablet personal computer (PC), a mobile communication terminal, an electronic notebook, an electronic book, a personal digital assistant (PDA), a portable multimedia player (PMP), a navigation device, an ultra-mobile PC (UMPC), a television, a game console, a wrist watch type electronic device, a head-mounted display, a personal computer monitor, a laptop computer, a car dashboard, a digital camera, a camcorder, an external billboard, an electric billboard, various medical devices, various inspection devices, various home appliances including a display area such as a refrigerator or a washing machine, an Internet-of-Things (IoT) device, and the like. A typical example of the display device 1 to be described later may be a smart phone, a tablet PC, or a laptop computer, but is not necessarily limited thereto.

The display device 1 may include a display panel 10, a display driving circuit 20, a circuit board 30, and a read-out circuit 40.

The display device 1 includes a display panel 10 having an active region AAR and a non-active region NAR. The active region AAR includes a display area on which an image is displayed. The active region AAR may completely overlap the display area. A plurality of pixels PX for displaying an image may be disposed within the display area. Each pixel PX may include a light emitting element ('EL' in FIG. 4).

The active region AAR further includes a fingerprint sensing area. The fingerprint sensing area is a region that reacts to light, and is configured to sense the amount and/or wavelength of incident light. The fingerprint sensing area may overlap the display area. For example, the fingerprint sensing area may be disposed within a limited area necessary for fingerprint recognition within the active region AAR, rather than within an entirety of the display area. In this case, the fingerprint sensing area may overlap a portion of the display area while it does not overlap another portion of the display area. Alternatively, the fingerprint sensing area may be defined as an entire area of the active region AAR. In this case, the entire surface of the active region AAR may be utilized as an area for fingerprint sensing. A plurality of optical sensors PS that react to light may be disposed in the fingerprint sensing area. Each optical sensor PS may include a photoelectric conversion element'PD' in FIG. 4 that detects incident light and converts the light into an electrical signal.

The non-active region NAR is disposed around the active region AAR. The non-active region NAR may be a bezel area of the display panel. The non-active region NAR may surround all sides (e.g., four sides in the drawing) of the active region AAR, but is not necessarily limited thereto, and may surround three, two, or even one side of the active region AAR.

The non-active region NAR may be disposed around the active region AAR. The display driving circuit 20 may be disposed in the non-active region NAR. The display driving circuit 20 may drive the plurality of pixels PX and/or the plurality of optical sensors PS. The display driving circuit 20 may output signals and voltages for driving the display panel 10. The display driving circuit 20 may be formed as an integrated circuit (IC) and mounted on the display panel 10. Signal lines for transferring signals between the display driving circuit 20 and the active region AAR may be further disposed in the non-active region NAR. For example, the display driving circuit 20 may be mounted on the circuit board 30.

Signal lines for applying a signal to the active region AAR or the read-out circuit 40 may be disposed in the non-active region NAR. The read-out circuit 40 may be connected to each optical sensor PS through the signal line and may receive a current flowing in each optical sensor PS to detect a user's fingerprint input. The read-out circuit 40 may be formed as an integrated circuit (IC) and attached on a display circuit board in a chip on film (COF) structure, but is not necessarily limited thereto, and may be attached on the non-active region NAR of the display panel 10 in a chip on glass (COG) method, a chip on plastic (COP) method or an ultrasonic bonding method.

The circuit board 30 may be attached to one end of the display panel 10 using an anisotropic conductive film (ACF). Lead lines of the circuit board 30 may be electrically connected to a pad unit of the display panel 10. The circuit board 30 may be a flexible film such as a flexible printed circuit board or a chip on film.

Figure 2:
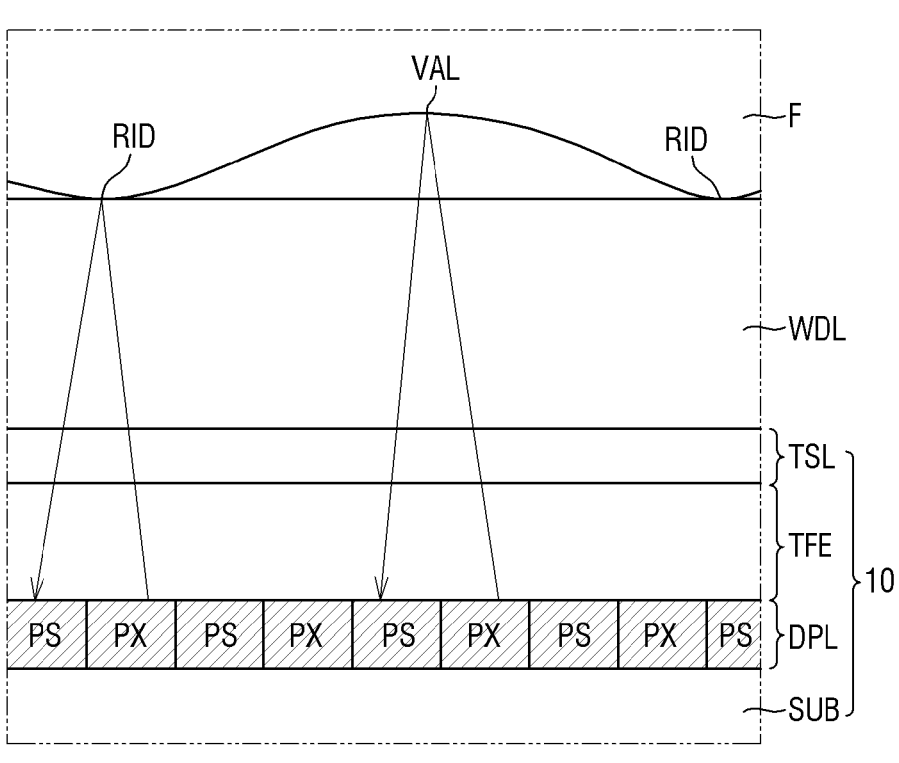
FIG. 2 illustrates fingerprint sensing of a display device according to an embodiment of the present disclosure.
Figure 2:

FIG. 2 illustrates fingerprint sensing of a display device according to an embodiment of the present disclosure.

Referring to FIG. 2, the display device 1 may further include a window WDL disposed on the display panel 10. The display panel 10 may include a substrate SUB, a display layer DPL disposed on the substrate SUB and including the pixels PX and the optical sensors PS, an encapsulation layer TFEL disposed on the display layer DPL, and a touch sensing layer TSL disposed on the encapsulation layer TFEL.

When the user's finger comes into contact with the top surface of the window WDL of the display device 1, the light outputted from the pixels PX of the display panel 10 may be reflected from a ridge RID of a fingerprint F of the user and valleys VAL between the ridges RID. In this case, a portion of the ridge RID of the fingerprint F comes into contact with the top surface of the window WDL, whereas a portion of the valley VAL of the fingerprint F does not come into contact with the window WDL. For example, the top surface of the window WDL is in contact with the air at the valley VAL portion.

When the fingerprint F is in contact with the top surface of the window WDL, light outputted from emission portions of the pixels PX may be reflected from the ridge RID and the valley VAL of the fingerprint F. In this case, since the refractive index of the fingerprint F and the refractive index of the air are different, the amount of the light reflected from the ridge RID of the fingerprint F and the amount of the light reflected from the valley VAL of the fingerprint F may be different. Accordingly, the ridge RID portion and the valley VAL portion of the fingerprint F may be detected based on a difference in the amount of the reflected light, for example, the light incident on the optical sensors PS. Since the optical sensor PS outputs an electrical signal (i.e., photocurrent) according to the difference in the amount of light, the pattern of the fingerprint F of the finger may be identified.

Figure 3:
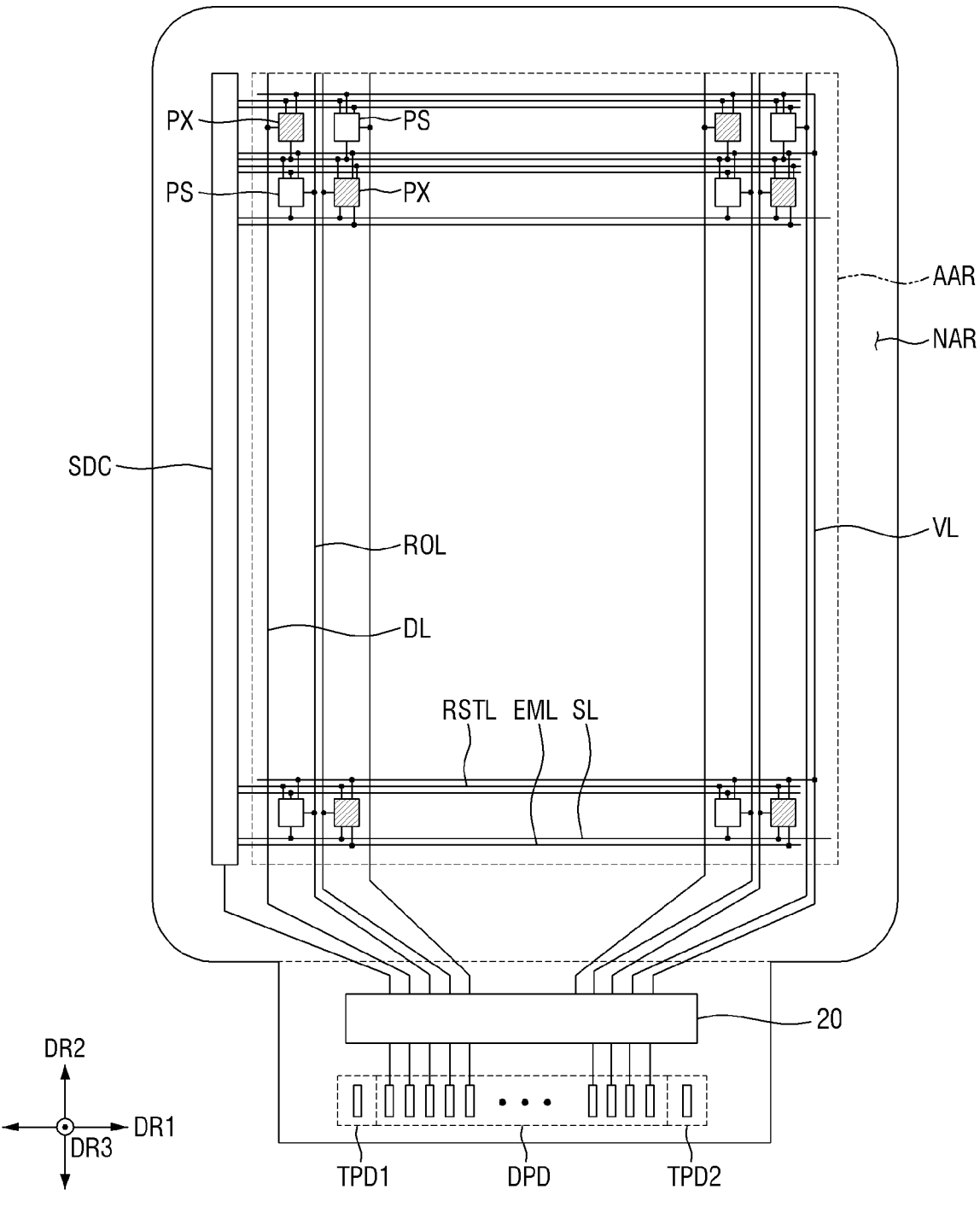
FIG. 3 is a schematic plan layout view of a display layer according to an embodiment of the present disclosure.

FIG. 3 is a schematic plan layout view of a display layer according to an embodiment of the present disclosure.

Referring to FIG. 3, in the active region AAR of the display layer DPL, scan lines SL and power voltage lines VL connected to the plurality of pixels PX and the plurality of optical sensors PS, emission control lines EML and data lines DL connected to the plurality of pixels PX, and a reset control line RSTL and a read-out line ROL connected to the plurality of optical sensors PS may be disposed.

The scan line SL may supply the scan signal received from a scan driver SDC to the plurality of pixels PX and the plurality of optical sensors PS. The scan lines SL may extend in the first direction DR1 and may be spaced apart from each other in the second direction DR2.

The emission control line EML may supply the emission control signal received from the scan driver SDC to the plurality of pixels PX. The emission control lines EML may extend in the first direction DR1 and may be spaced apart from each other in the second direction DR2.

The data line DL may supply the data voltage received from the display driving circuit 20 to the plurality of pixels PX. The data lines DL may extend in the second direction DR2 and may be spaced apart from each other in the first direction DR1.

The power voltage line VL may supply the power voltage received from the display driving circuit 20 to the plurality of pixels PX and the plurality of optical sensors PS. Here, the power voltage may be at least one of a driving power voltage ELVDD, a common voltage ELVSS, a first initialization voltage VINT, and a second initialization voltage VAINT. The driving power voltage ELVDD may be a relatively high potential voltage for driving the light emitting element and the photoelectric conversion element, and the common voltage ELVSS may be a relatively low potential voltage for driving the light emitting element and the photoelectric conversion element. For example, the driving power voltage ELVDD may have a higher potential than the common voltage ELVSS. The power voltage lines VL may extend from the active region AAR in the second direction DR2, may be spaced apart from each other in the first direction DR1, and may be connected to each other in the non-active region NAR.

The reset control line RSTL may supply the reset control signal received from the scan driver SDC to the plurality of optical sensors PS. The reset control lines RSTL may extend in the first direction DR1 and may be spaced apart from each other in the second direction DR2.

The read-out line ROL may supply a sensing current generated in the optical sensor PS according to external light to the read-out circuit 40 of FIG. 1. The read-out lines ROL may extend in the second direction DR2 and may be spaced apart from each other in the first direction DR1.

The non-active region NAR of the display layer DPL may include the scan driver SDC and a display driving circuit 20.

The scan driver SDC may generate a plurality of scan signals based on the scan control signal, and may sequentially supply the plurality of scan signals to the plurality of scan lines SL according to a set order. In addition, the scan driver SDC may sequentially supply the emission control signal to the plurality of emission control lines EML according to a set order. The scan driver SDC may sequentially supply the reset control signal to the plurality of reset control lines RSTL according to a set order.

The display driving circuit 20 may output signals and voltages for driving the display panel 10. The display driving circuit 20 may supply a data voltage to the data line DL. The data voltage may be supplied to the plurality of pixels PX, and the luminance of the plurality of pixels PX may be determined.

The non-active region NAR may include a read-out circuit. The read-out circuit may be connected to each optical sensor PS through the read-out line ROL, and may generate fingerprint detection data according to the magnitude of current sensed by each optical sensor PS to transmit the fingerprint detection data to the main processor. By analyzing the fingerprint sensing data, the main processor may determine whether the fingerprint detection data matches the user's fingerprint by comparing the fingerprint detection data with a preset fingerprint. When the preset fingerprint and the fingerprint sensing data transmitted from the read-out circuit are the same, the set functions may be performed.

The non-active region NAR of the display layer DPL may further include a display pad unit DPD and first and second touch pad units TPD1 and TPD2. The display pad unit DPD, the first touch pad unit TPD1, and the second touch pad unit TPD2 may be electrically connected to the circuit board 30 by using a low-resistance high-reliability material such as an anisotropic conductive film or SAP. The display pad unit DPD may include a plurality of display pads.

In the present embodiment, each scan line SL is illustrated as being simultaneously connected to the plurality of pixels PX and the plurality of optical sensors PS, but the present disclosure is not necessarily limited thereto, and the type and disposition shape of the signal lines may vary. In this case, the plurality of pixels PX and the plurality of optical sensors PS may be turned on or off based on the same scan signal. Accordingly, the shape of the fingerprint may be optically sensed during the period when the screen is displayed.

Figure 4:
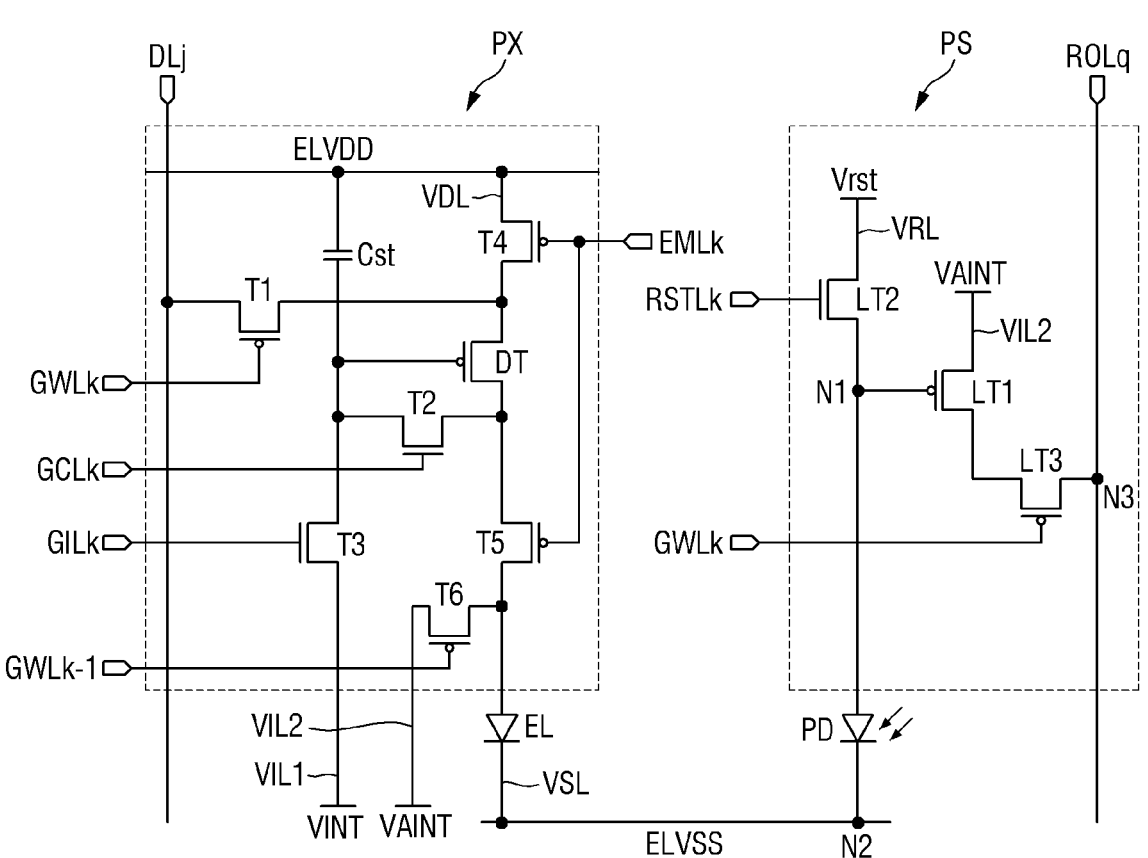
FIG. 4 is a circuit diagram illustrating a pixel and an optical sensor according to an embodiment of the present disclosure.

FIG. 4 is a circuit diagram illustrating a pixel and an optical sensor according to an embodiment of the present disclosure.

FIG. 4, for simplicity of description, exemplifies a circuit diagram of the pixel PX connected to a k scan initialization line G1Lk, a $k^{th}$ scan write line GWLk, a $k^{th}$ scan control line GCLk, a $(k-1)^{th}$ scan write line GWLk-1, and a $j^{th}$ data line DLj, and the optical sensor PS connected to the $k^{th}$ scan write line GWLk, a $k^{th}$ reset control line RSTLk, and a $q^{th}$ read-out line ROLq.

The pixel PX may include a light emitting element EL and a pixel driving unit controlling the emission amount of the light emitting element EL. The pixel driving unit may include a driving transistor DT, a plurality of switch elements, and a first capacitor Cst. The switch elements include first to sixth transistors T1, T2, T3, T4, T5, and T6. The pixel driving unit may be connected to a driving voltage line VDL to which the driving voltage ELVDD is applied, a common voltage line VSL to which the common voltage ELVSS is applied, a first initialization voltage line VIL1 to which the first initialization voltage VINT is applied, and a second initialization voltage line VIL2 to which the second initialization voltage VAINT is applied.

The driving transistor DT may include a gate electrode, a first electrode, and a second electrode. The driving transistor DT controls a drain-source current Isd (hereinafter, referred to as "driving current") flowing between the first electrode and the second electrode according to a data voltage applied to the gate electrode. The driving current Isd flowing through a channel of the driving transistor DT is proportional to the square of the difference between a threshold voltage and a voltage Vgs between the first electrode and the gate electrode of the driving transistor DT, as shown in Equation 1.

$$Isd = k' \times (Vsg - Vth)^2 \qquad \text{[Equation 1]}$$

In Equation 1, Isd is a source-drain current flowing through the channel of the driving transistor DT as a driving current, $k^{th}$ is a proportional coefficient determined by the structure and physical characteristics of the driving transistor, Vsg is a voltage between the first electrode and the gate electrode of the driving transistor, and Vth is the threshold voltage of the driving transistor.

The light emitting element EL emits light by the driving current Isd. As the driving current Isd increases, the amount of light emitted from the light emitting element EL may increase.

The light emitting element EL may be an organic light emitting diode including an organic light emitting layer disposed between an anode electrode and a cathode electrode. Alternatively, the light emitting element EL may be a quantum dot light emitting element including a quantum dot light emitting layer disposed between an anode electrode and a cathode electrode.

Figure 8:
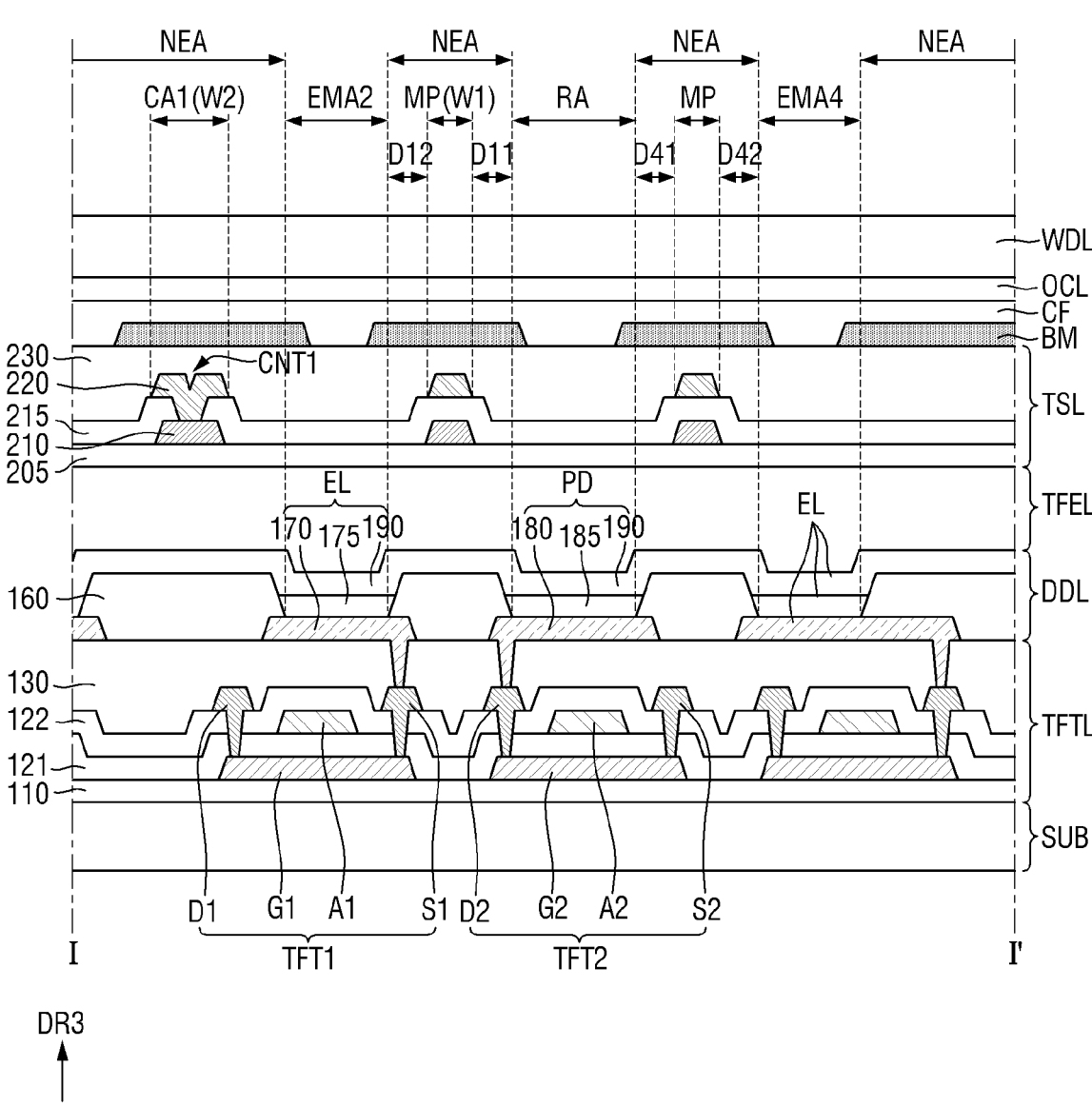
FIG. 8 is a cross-sectional view illustrating an example of the display device taken along line I-I' of FIG. 7.

Alternatively, the light emitting element EL may be an inorganic light emitting element including an inorganic semiconductor disposed between an anode electrode and a cathode electrode. When the light emitting element EL is an inorganic light emitting element, a micro light emitting diode or a nano light emitting diode may be included. In FIG. 8, the anode electrode of the light emitting element EL corresponds to a pixel electrode 170, and the cathode electrode thereof corresponds to a common electrode 190.

The anode electrode of the light emitting element EL may be connected to the second electrode of the fifth transistor T5 and the first electrode of the sixth transistor T6, and the cathode electrode may be connected to the common voltage line VSL to which the common voltage ELVSS is applied.

The first transistor T1 is turned on by the $k^{th}$ scan write signal of the $k^{th}$ scan write line GWLk to connect the first electrode of the driving transistor DT to the $j^{th}$ data line DLj. Accordingly, the data voltage of the $j^{th}$ data line DLj may be applied to the first electrode of the driving transistor DT. The gate electrode of the first transistor T1 may be connected to the $k^{th}$ scan write line GWLk, the first electrode thereof may be connected to the $j^{th}$ data line DLj, and the second electrode thereof may be connected to the first electrode of the driving transistor DT.

The second transistor T2 is turned on by the $k^{th}$ scan control signal of the $k^{th}$ scan control line GCLk to connect the gate electrode of the driving transistor DT to the second electrode of the driving transistor DT. When the gate electrode of the driving transistor DT is connected to the second electrode thereof, the driving transistor DT is driven as a diode. The gate electrode of the second transistor T2 may be connected to the $k^{th}$ scan control line GCLk, the first electrode may be connected to the gate electrode of the driving transistor DT, and the second electrode may be connected to the second electrode of the driving transistor DT.

The third transistor T3 is turned on by the $k^{th}$ scan initialization signal of the $k^{th}$ scan initialization line GILk to connect the gate electrode of the driving transistor DT to the first initialization voltage line VIL1. Accordingly, the first initialization voltage VINT1 of the first initialization voltage line VIL1 may be applied to the gate electrode of the driving transistor DT. The gate electrode of the third transistor T3 may be connected to the $k^{th}$ scan initialization line GILk, the first electrode thereof may be connected to the first initialization voltage line VIL1, and the second electrode thereof may be connected to the gate electrode of the driving transistor DT.

The fourth transistor T4 is turned on by the $k^{th}$ emission control signal of the $k^{th}$ emission control line EMLk to connect the first electrode of the driving transistor DT to the driving voltage line VDL to which the driving voltage ELVDD is applied. The gate electrode of the fourth transistor T4 may be connected to the $k^{th}$ emission control line EMLk, the first electrode thereof may be connected to the driving voltage line VDL, and the second electrode thereof may be connected to the first electrode of the driving transistor DT.

The fifth transistor T5 is turned on by the $k^{th}$ emission control signal of the $k^{th}$ emission control line EMLk to connect the second electrode of the driving transistor DT to the anode electrode of the light emitting element EL. The gate electrode of the fifth transistor T5 may be connected to the $k^{th}$ emission control line EMLk, the first electrode thereof may be connected to the second electrode of the driving transistor DT, and the second electrode thereof may be connected to the anode electrode of the light emitting element EL.

When both the fourth transistor T4 and the fifth transistor T5 are turned on, the driving current Isd of the driving transistor DT according to the voltage of the gate electrode of the driving transistor DT may flow through the light emitting element EL.

The sixth transistor T6 is turned on by the $(k-1)^{th}$ scan signal of the $(k-1)^{th}$ scan write line GWLk−1 to connect the anode electrode of the light emitting element EL to the second initialization voltage line VIL2. The second initialization voltage VAINT of the second initialization voltage line VIL2 may be applied to the anode electrode of the light emitting element EL. The gate electrode of the sixth transistor T6 may be connected to the $(k-1)^{th}$ scan write line GWLk−1, the first electrode thereof may be connected to the anode electrode of the light emitting element EL, and the second electrode thereof may be connected to the second initialization voltage line VIL2.

The first capacitor Cst is formed between the gate electrode of the driving transistor DT and the driving voltage line VDL. The first capacitor electrode of the first capacitor Cst may be connected to the gate electrode of the driving transistor DT, and the second capacitor electrode thereof may be connected to the driving voltage line VDL.

When the first electrode of each of the driving transistor DT and the first to sixth transistors T1, T2, T3, T4, T5, and T6 is a source electrode, the second electrode thereof may be a drain electrode. Alternatively, when the first electrode of each of the driving transistor DT and the first to sixth transistors T1, T2, T3, T4, T5, and T6 is a drain electrode, the second electrode thereof may be a source electrode.

The active layer of each of the driving transistor DT and the first to sixth transistors T1, T2, T3, T4, T5, and T6 may also be formed of any one of polysilicon, amorphous silicon, and oxide semiconductor. For example, the active layer of each of the driving transistor DT, the first transistor T1, and the fourth to sixth transistors T4 to T6 may be made of polysilicon. The active layer of each of the second transistor T2 and the third transistor T3 may be formed of an oxide semiconductor. In this case, the driving transistor DT, the first transistor T1, and the fourth to sixth transistors T4 to T6 may be formed of a P-type MOSFET, and the second transistor T2 and the third transistor T3 may also be formed of an N-type MOSFET.

Each of the plurality of optical sensors PS may include a photoelectric conversion element PD and a sensing driver controlling a sensing current according to a photocurrent of the photoelectric conversion element PD. The sensing driver includes a plurality of sensing transistors LT1, LT2, and LT3 for controlling a sensing current generated by the photoelectric conversion element PD. The sensing driver may be connected to a reset voltage line VRL to which a reset voltage Vrst is applied, the second initialization voltage line VIL2 to which the second initialization voltage VAINT is applied, and the common voltage line VSL to which the common voltage ELVSS is applied.

Each of the photoelectric conversion elements PD may be a photodiode including a sensing anode electrode, a sensing cathode electrode, and a photoelectric conversion layer disposed between the sensing anode electrode and the sensing cathode electrode. Each of the photoelectric conversion elements PD may convert externally incident light into an electrical signal. The photoelectric conversion element PD may be an inorganic photodiode or a phototransistor formed of a pn-type or pin-type inorganic material. Alternatively, the photoelectric conversion element PD may also be an organic photodiode including an electron donating material generating donor ions and an electron accepting material generating acceptor ions. In FIG. 8, the sensing anode electrode of the photoelectric conversion element PD corresponds to a first electrode 180, and the sensing cathode electrode corresponds to the common electrode 190.

When the photoelectric conversion element PD is exposed to external light, photocharges may be generated, and the generated photocharges may be accumulated in the sensing anode electrode of the photoelectric conversion element PD. In this case, the voltage of a first node N1 electrically connected to the sensing anode electrode may increase. When the photoelectric conversion element PD and the $q^{th}$ read-out line ROLq are connected according to the turn-on of the first and third sensing transistors LT1 and LT3, a sensing voltage may be accumulated at the third node N3 between the qh read-out line ROLq and the third sensing transistor LT3 in proportion to the voltage of the first node N1 in which the electric charges are accumulated.

The first sensing transistor LT1 may be turned on by the voltage of the first node N1 applied to the gate electrode to connect the second initialization voltage line VIL2 to the second electrode of the third sensing transistor LT3. The gate electrode of the first sensing transistor LT1 may be connected to the first node N1, the first electrode thereof may be connected to the second initialization voltage line VIL2, and the second electrode thereof may be connected to the first electrode of the third sensing transistor LT3. The first sensing transistor LT1 may be a source follower amplifier that generates a source-drain current in proportion to the amount of electric charges of the first node N1 inputted to the gate electrode thereof. Although the first electrode of the first sensing transistor LT1 is illustrated as being connected to the second initialization voltage line VIL2, the present disclosure is not necessarily limited thereto, and the first electrode of the first sensing transistor LT1 may also be connected to the driving voltage line VDL or the first initialization voltage line VILL.

The second sensing transistor LT2 may be turned on by the $k^{th}$ reset control signal of the $k^{th}$ reset control line RSTLk to connect the first node N1 to the reset voltage line VRL applying the reset voltage Vrst. The gate electrode of the second sensing transistor LT2 may be connected to the $k^{th}$ reset control line RSTLk, the first electrode thereof may be connected to the reset voltage line VRL, and the second electrode thereof may be connected to the first node N.

The third sensing transistor LT3 may be turned on by the $k^{th}$ scan write signal of the $k^{th}$ scan write line GWLk to connect the second electrode of the first sensing transistor LT1 and the $q^{th}$ read-out line ROLq. The gate electrode of the third sensing transistor LT3 may be connected to the $k^{th}$ scan write line GWLk, the first electrode thereof may be connected to the second electrode of the first sensing transistor LT1, and the second electrode thereof may be connected to the third node N3 and the $q^{th}$ read-out line ROLq.

An active layer of each of the first to third sensing transistors LT1, LT2, and LT3 may also be formed of any one of polysilicon, amorphous silicon, and an oxide semiconductor. For example, the active layer of the first sensing transistor LT1 and the third sensing transistor LT3 may be made of polysilicon. The active layer of the second sensing transistor LT2 may be formed of an oxide semiconductor. In this case, the first sensing transistor LT and the third sensing transistor LT3 may be formed of a P-type MOSFET, and the second sensing transistor LT2 may also be formed of an N-type MOSFET.

Figure 5:
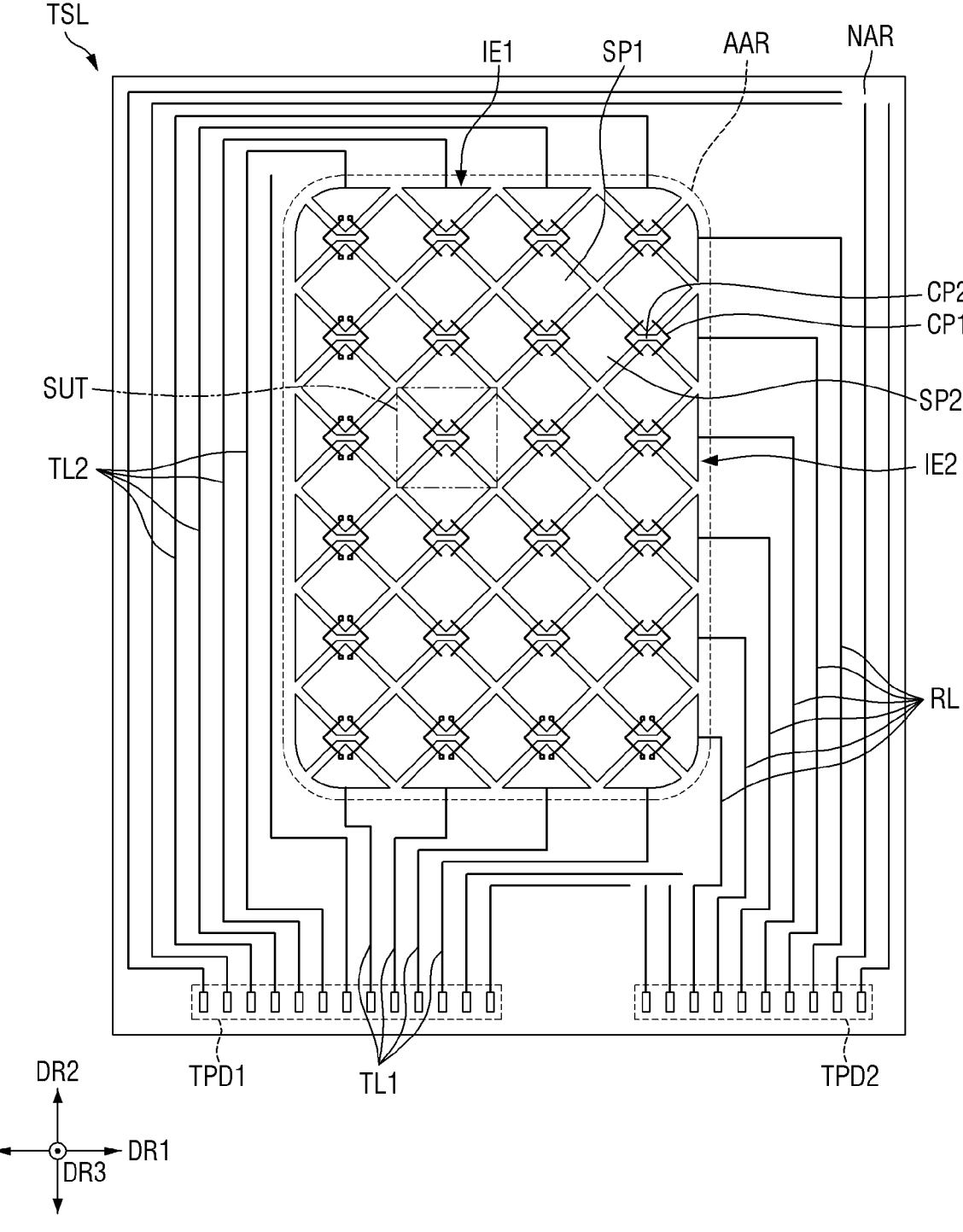
FIG. 5 is a schematic plan layout view of a touch sensing layer of a display panel according to an embodiment of the present disclosure.

FIG. 5 is a schematic plan layout view of a touch sensing layer of a display panel according to an embodiment of the present disclosure.

Referring to FIG. 5, the touch sensing layer TSL includes the active region AAR and the non-active region NAR. The active region AAR may be a touch sensing area for sensing a user's touch, and the non-active region NAR may be a touch peripheral area disposed in the periphery of the touch sensing area. The touch sensing area may overlap the display area and the fingerprint sensing area of the display layer DPL described above, and may overlap the non-display area of the display layer DPL described above in the touch peripheral area.

The active region AAR may include a plurality of first touch electrodes IE1 and a plurality of second touch electrodes IE2. One of the first touch electrode IE1 and the second touch electrode IE2 may be a driving electrode, and the other may be a sensing electrode. In the present embodiment, the case where the first touch electrode IE1 is a driving electrode and the second touch electrode IE2 is a sensing electrode is exemplified.

The first touch electrode IE1 may extend in the second direction DR2. The first touch electrode IE1 may include a plurality of first sensor portions SP1 arranged along the second direction DR2 and a first connection portion CP1 electrically connecting the adjacent first sensor portions SP1 to each other. The plurality of first touch electrodes IE1 may be arranged in the first direction DR1.

The second touch electrode IE2 may extend in the first direction DR1. The second sensing electrode IE2 may include a plurality of second sensor portions SP2 arranged in the first direction DR1 and a second connection portion CP2 electrically connecting the adjacent second sensor portions SP2 to each other. The plurality of second touch electrodes IE2 may be arranged in the second direction DR2.

At least some of the first sensor portions SP1 and the second sensor portions SP2 may have a rhombic shape. Some of the first sensor portions SP1 and the second sensor portions SP2 may have a shape of a figure cut from a rhombus (e.g., a rhombic section). For example, each of the first sensor portions SP1 and the second sensor portions SP2 positioned at both ends in the extension direction may have a triangular shape obtained by cutting a rhombus in half. The first sensor portions SP1 having a rhombic or triangular shape and the second sensor portions SP2 having a rhombic or triangular shape may have substantially the same size and shape. However, the embodiment is not necessarily limited to the above example, and the shapes and sizes of the first sensor portion SP1 and the second sensor portion SP2 may be variously modified.

The first connection portion CP may connect the corner portions of the adjacent rhombic or triangular first sensor portions SP1 to each other. The second connection portion CP2 may connect the corner portions of the adjacent rhombic or triangular second sensor portions SP2 to each other. The widths of the first connection portion CP1 and the second connection portion CP2 may be smaller than the widths of the first sensor portion SP1 and the second sensor portion SP2.

The first touch electrode IE1 and the second touch electrode IE2 may be electrically insulated from each other and may intersect each other. Insulation between the first touch electrode IE1 and the second touch electrode IE2 may be ensured by being connected through conductive layers positioned on different layers in the intersecting region. Intersection between the first touch electrode IE1 and the second touch electrode IE2 may be achieved by the first connection portion CP1 and/or the second connection portion CP2. For the insulation and intersection, at least one of the first connection portion CP1 or the second connection portion CP2 may be positioned on a different layer from the first touch electrode IE1 and the second touch electrode IE2. The stacked structure of the touch sensing layer TSL will be described with reference to FIG. 8.

The first sensor portions SP1 and the second sensor portions SP2 adjacent to each other may constitute a unit sensing area SUT. For example, half of two adjacent first sensor portions SP1 and half of two adjacent second sensor portions SP2 with respect to a region where the first touch electrode IE1 and the second touch electrode IE2 intersect may constitute a single square or rectangle. As described above, an area defined by the half areas of the two adjacent first and second sensor portions SP1 and SP2 may be one unit sensing area SUT. A plurality of unit sensing areas SUT may be arranged in a matrix.

In each unit sensing area SUT, by measuring the capacitance value between the adjacent first and second sensor portions SP1 and SP2, it is possible to determine whether or not a touch is inputted and to calculate the corresponding position as touch input coordinates. The touch sensing may be performed in a mutual cap method, but is not necessarily limited thereto.

Each unit sensing area SUT may be larger in size than a pixel. For example, the unit sensing area SUT may correspond to the size of a plurality of pixels. For example, length of one side of the unit sensing area SUT may be in the range of 4 to 5 mm, but is not necessarily limited thereto.

A plurality of touch signal lines are disposed in the non-active region NAR. The touch signal line extends from the first and second touch pad units TPD1 and TPD2 to the non-active region NAR.

The plurality of touch signal lines includes a plurality of touch driving lines TL (TL1 and TL2) and a plurality of touch sensing lines RL. The plurality of touch signal lines may further include a touch ground line and/or a touch antistatic line.

The touch driving line TL may be connected to the first touch electrode 1El. In an embodiment of the present disclosure, a plurality of touch driving lines may be connected to the one first touch electrode IE1. For example, the touch driving line TL may include a first touch driving line TL1 connected to a lower end of the first touch electrode IE1 and a second touch driving line TL2 connected to an upper end of the first touch electrode IE1. The first touch driving line TL1 may extend from the first touch pad unit TPD1 to one side in the second direction DR2 and may be connected to the lower end of the first touch electrode IE1. The second touch driving line TL2 may extend from the first touch pad unit TPD1 to one side in the second direction DR2 and bypass the left edge of the active region AAR (or the touch sensing area) and may be connected to the upper end of the first touch electrode IE1.

The touch sensing line RL may be connected to the second touch electrode IE2. In an embodiment of the present disclosure, one touch sensing line RL may be connected to one second touch electrode IE2. Each touch sensing line RL may extend from the second touch pad unit TPD2 to one side in the second direction DR2 and extend toward the right edge of the active region AAR (or touch sensing area) and may connected to a right end of the second touch electrode IE2.

When the first touch electrode IE1 and the second touch electrode IE2 are driven by a mutual capacitance method, a driving signal is applied to the first touch electrode IE1 through the first and second touch driving lines TL1 and TL2, and the capacitance formed in the unit sensing area SUT is charged. Thereafter, a change in capacitance of the second touch electrode IE2 is measured through the touch sensing line RL to determine whether a touch is inputted.

Figure 6:
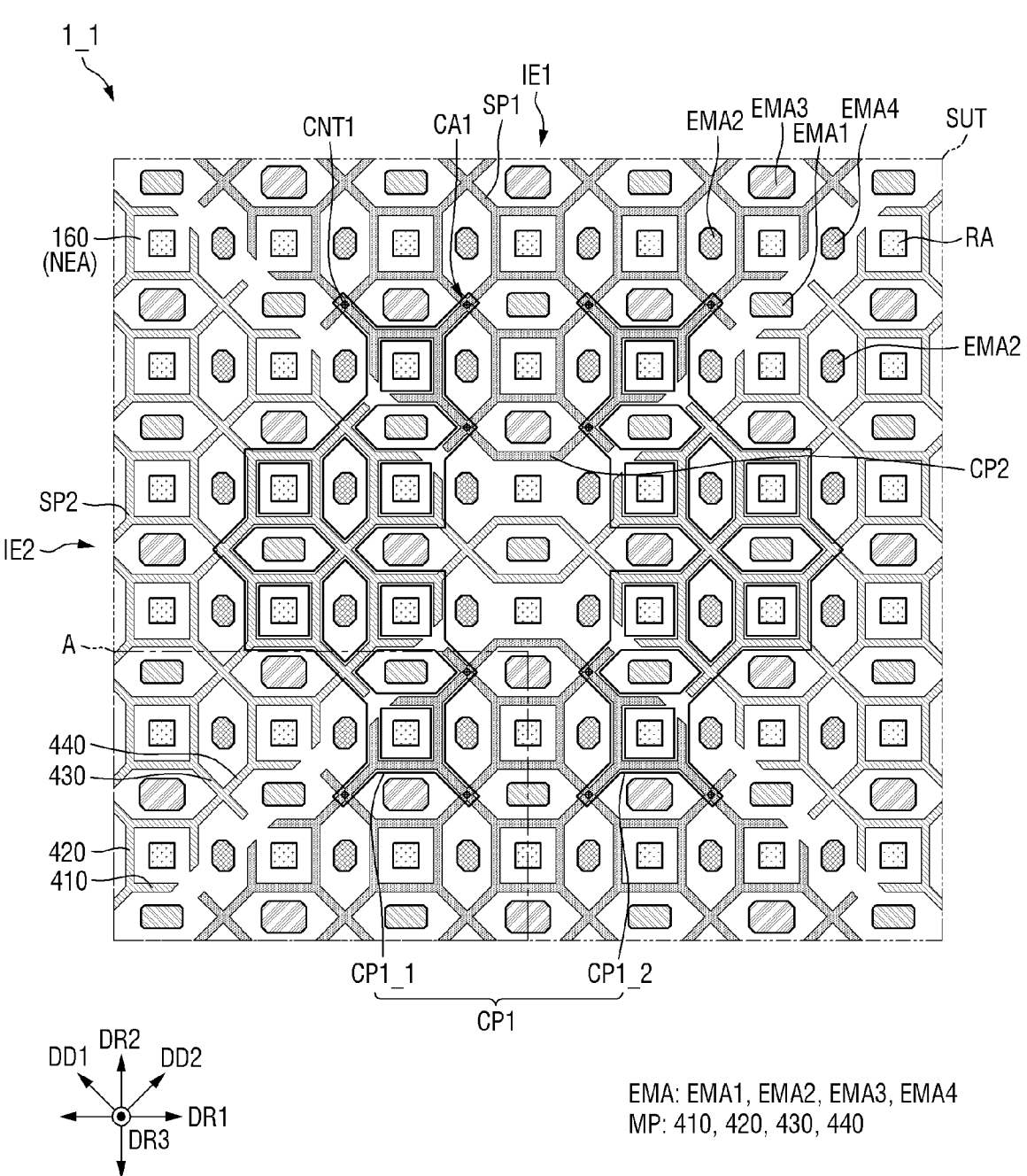
FIG. 6 is an enlarged view illustrating a pixel and an optical sensor of a display layer and touch electrodes of a touch sensing layer according to an embodiment of the present disclosure.

FIG. 6 is an enlarged view illustrating a pixel and an optical sensor of a display layer and touch electrodes of a touch sensing layer according to an embodiment of the present disclosure.

The display layer DPL includes the plurality of pixels PX and the plurality of optical sensors PS. The plurality of pixels PX may include a plurality of light emitting units EMA (EMA1, EMA2, EMA3, and EMA4) that each emit light in the active region AAR (or the display area). The plurality of light emitting units EMA may be defined as areas in which the pixel electrode 170 is exposed by the opening of the pixel defining layer 160 in the cross-sectional view of FIG. 8, and may be defined as areas in which the exposed pixel electrode 170 and the light emitting layer 175 overlap. The first light emitting unit EMA1 may emit first light of a red wavelength band (e.g., red light). The second light emitting unit EMA2 and the fourth light emitting unit EMA4 may emit second light of a green wavelength band (e.g., green light). The third light emitting unit EMA3 may emit third light of a blue wavelength band (e.g., blue light).

The plurality of optical sensors PS may include a plurality of light sensing units RA that sense light incident within the active region AAR (or fingerprint sensing area). The light sensing unit RA may be defined as an area in which the first electrode 180 is exposed by the opening of the pixel defining layer 160 in cross-sectional view, and may be defined as an area in which the exposed first electrode 180 and the photoelectric conversion layer 185 overlap.

A non-emission area is disposed between the light emitting units EMA of each pixel PX. In addition, a non-sensing area is disposed between the light sensing units RA of each optical sensor PS. In the present specification, an area in which the non-emission area and the non-sensing area overlap will be referred to as a peripheral portion NEA. The pixel defining layer 160 may be disposed in the peripheral portion NEA.

The plurality of light emitting units EMA1, EMA2, EMA3, and EMA4 may be spaced apart from each other in the first direction DR1 and the second direction DR2. For example, the first light emitting unit EMA1 and the third light emitting unit EMA3 may be alternately arranged in the first direction DR1 and the second direction DR2. The second light emitting unit EMA2 and the fourth light emitting unit EMA4 may be alternately arranged in the first direction DR1 and the second direction DR2.

The plurality of light emitting units EMA1, EMA2, EMA3, and EMA4 may be alternately disposed in diagonal directions DD1 and DD2 between the first direction DR1 and the second direction DR2. The first diagonal direction DD1 may be a direction inclined at 45° with respect to the first direction DR1 and the second direction DR2, and the second diagonal direction DD2 may be a direction intersecting the first diagonal direction DDL. For example, the first light emitting unit EMA1 and the fourth light emitting unit EMA4 may be alternately arranged in the first diagonal direction DD1. The third light emitting unit EMA3 and the second light emitting unit EMA2 may be alternately arranged in the first diagonal direction DD1. The first light emitting unit EMA1 and the second light emitting unit EMA2 may be alternately arranged in the second diagonal direction DD2, and the third light emitting unit EMA3 and the fourth light emitting unit EMA4 may be alternately arranged in the second diagonal direction DD2.

The light sensing unit RA may be disposed between the second light emitting unit EMA2 and the fourth light emitting unit EMA4 adjacent in the first direction DR1, and may be disposed between the first light emitting unit EMA1 and the third light emitting unit EMA3 adjacent in the second direction DR2.

The plurality of light emitting units EMA1, EMA2, EMA3, and EMA4 may have different sizes. The size of the first light emitting unit EMA1 may be greater than the size of the second light emitting unit EMA2 and the fourth light emitting unit EMA4, and may be smaller than the size of the third light emitting unit EMA3. The size of the second light emitting unit EMA2 may be substantially the same as the size of the fourth light emitting unit EMA4.

The first light emitting unit EMA1, the second light emitting unit EMA2, the third light emitting unit EMA3, and the fourth light emitting unit EMA4 may have an octagonal planar shape, but are not necessarily limited thereto. The first light emitting unit EMA1, the second light emitting unit EMA2, the third light emitting unit EMA3, and the fourth light emitting unit EMA4 may have a quadrilateral planar shape such as a rhombus or another polygonal planar shape. In addition, each of the light sensing units RA may have a quadrilateral planar shape, but is not necessarily limited thereto. Each of the light sensing units RA may have a planar shape of a rhombus, an octagon, or another polygon.

The first touch electrode IE1 and the second touch electrode IE2 of the touch sensing layer TSL may include an electrode pattern MP of a mesh shape. The electrode pattern MP may be disposed along a boundary between the pixel PX and the optical sensor PS in the peripheral portion NEA. The electrode pattern MP might not overlap the light emitting unit EMA and the light sensing unit RA. A width of the electrode pattern MP in one direction may be smaller than a width of the peripheral portion NEA in one direction (e.g., in the same one direction).

The electrode pattern MP may include a plurality of first electrode lines 410 extending in the first direction DR1, a plurality of second electrode lines 420 extending in the second direction DR2, a plurality of third electrode lines 430 extending in the first diagonal direction DD1, and a plurality of fourth electrode lines 440 extending in the second diagonal direction DD2.

Each of the first electrode lines 410 may be disposed outside the light sensing unit RA, the first light emitting unit EMA1, or the third light emitting unit EMA3. Each of the second electrode lines 420 may be disposed outside the light sensing unit RA, the second light emitting unit EMA2, or the fourth light emitting unit EMA4. Each of the third electrode lines 430 may be disposed outside any one of the first to fourth light emitting units EMA1, EMA2, EMA3, and EMA4. Each of the fourth electrode lines 440 may be disposed outside any one of the first to fourth light emitting units EMA1, EMA2, EMA3, and EMA4.

In the present embodiment, the light sensing unit RA may be disposed in a mesh hole formed by the first electrode lines 410 and the second electrode lines 420 that intersect. The two first electrode lines 410 and the two second electrode lines 420 surrounding the light sensing unit RA may have a quadrilateral planar shape, but are not necessarily limited thereto. For example, the mesh hole in which the light sensing unit RA is disposed may have a quadrilateral planar shape.

The first light emitting unit EMA1 or the third light emitting unit EMA3 may be disposed in the mesh hole formed by the first electrode lines 410, the third electrode lines 430, and the fourth electrode lines 440 that intersect. The two first electrode lines 410, the two third electrode lines 430, and the two fourth electrode lines 440 surrounding the first light emitting unit EMA1 or the third light emitting unit EMA3 may have a hexagonal planar shape. For example, the mesh hole in which the first light emitting unit EMA1 or the third light emitting unit EMA3 is disposed may have a hexagonal planar shape having two sides parallel to the second direction DR2.

The second light emitting unit EMA2 or the fourth light emitting unit EMA4 may be disposed in the mesh hole formed by the second electrode lines 420, the third electrode lines 430, and the fourth electrode lines 440 that intersect. The two second electrode lines 420, the two third electrode lines 430, and the two fourth electrode lines 440 surrounding the second light emitting unit EMA2 or the fourth light emitting unit EMA4 may have a hexagonal planar shape. For example, the mesh hole in which the second light emitting unit EMA2 or the fourth light emitting unit EMA4 is disposed may have a hexagonal planar shape having two sides parallel to the first direction DR1.

For example, since the planar shape of the mesh hole in which the plurality of light sensing units RA are disposed is a quadrilateral shape, and the planar shape of the mesh hole in which the plurality of light emitting units EMA1, EMA2, EMA3, and EMA4 are disposed is an octagonal shape, the planar shapes may be different from each other. In addition, a planar shape of the plurality of light sensing units RA may be different from a planar shape of a mesh hole in which the plurality of light sensing units RA are disposed. For an example, the planar shape of the plurality of light sensing units RA may be the same quadrilateral shape as the planar shape of a mesh hole in which the plurality of light sensing units RA are disposed. A planar shape of the plurality of light emitting units EMA1, EMA2, EMA3, and EMA4 may be an octagonal shape, and a shape of a mesh hole in which the plurality of light emitting units EMA1, EMA2, EMA3, and EMA4 are disposed may be a hexagonal shape, so that the shapes are different from each other.

Each of the mesh holes may be defined by an electrode pattern MP of the first touch electrodes IE1 and the second touch electrodes IE2. Each of the mesh holes may be included in the peripheral portion NEA. Although it is illustrated that the mesh holes correspond one-to-one to the plurality of light emitting units EMA1, EMA2, EMA3, and EMA4 in the present embodiment, the present disclosure is not necessarily limited thereto. Each of the mesh holes may also correspond to the two or more light emitting units EMA1, EMA2, EMA3, and EMA4.

In addition, the sizes of the mesh holes in which the plurality of light emitting units EMA1, EMA2, EMA3, and EMA4 and the plurality of light sensing units RA are disposed may also be different from each other or may also be the same.

All of the first to fourth electrode lines 410, 420, 430, and 440 corresponding to one first sensor portion SP1 may be physically connected. The first to fourth electrode lines 410, 420, 430, and 440 corresponding to one second sensor portion SP2 may all be physically connected. The first to fourth electrode lines 410, 420, 430, and 440 included in one first sensor portion SP1 may be spaced apart from the first to fourth electrode lines 410, 420, 430, and 440 included in the other first sensor portion SP1. In addition, the first to fourth electrode lines 410, 420, 430, and 440 included in one first sensor portion SP1 may be spaced apart from the first to fourth electrode lines 410, 420, 430, and 440 included in one second sensor portion SP2.

The adjacent first sensor portions SP1 may be electrically connected to each other by the first connection portions CP1 (CP1_1 and CP1_2) disposed on a different conductive layer. The first sensor portion SP1 and the first connection portion CP1 may be connected in first contact areas CA1 including first contact holes CNT1. Although one first connection portion CP1 is disconnected, the first sensor portions SP1 adjacent to each other by the other first connection portion CP1 may maintain electrical connection. The adjacent second sensor portions SP2 may be electrically connected to each other by the second connection portion CP2 disposed on the same conductive layer.

The display device 1_1, according to the present embodiment, may include the plurality of light emitting units EMA1, EMA2, EMA3, and EMA4 and the plurality of light sensing units RA. The plurality of first touch electrodes IE1 and the plurality of second touch electrodes IE2 disposed on the plurality of light emitting units EMA1, EMA2, EMA3, and EMA4 and the plurality of light sensing units RA may have the electrode pattern MP of a mesh shape. Accordingly, the plurality of first touch electrodes IE1 and the plurality of second touch electrodes IE2 do not overlap the plurality of light emitting units EMA1, EMA2, EMA3, EMA4 and the plurality of light sensing units RA, and thus the light emitted from the light emitting units EMA1, EMA2, EMA3, and EMA4 may be prevented from being blocked by the plurality of first touch electrodes IE1 and the plurality of second touch electrodes IE2, or the light incident on the light sensing unit RA may be prevented from being blocked. For example, the plurality of first touch electrodes IE1 and the plurality of second touch electrodes IE2 might not be visually recognized by a user, and external light may be stably incident on the light sensing unit RA.

Figure 7:
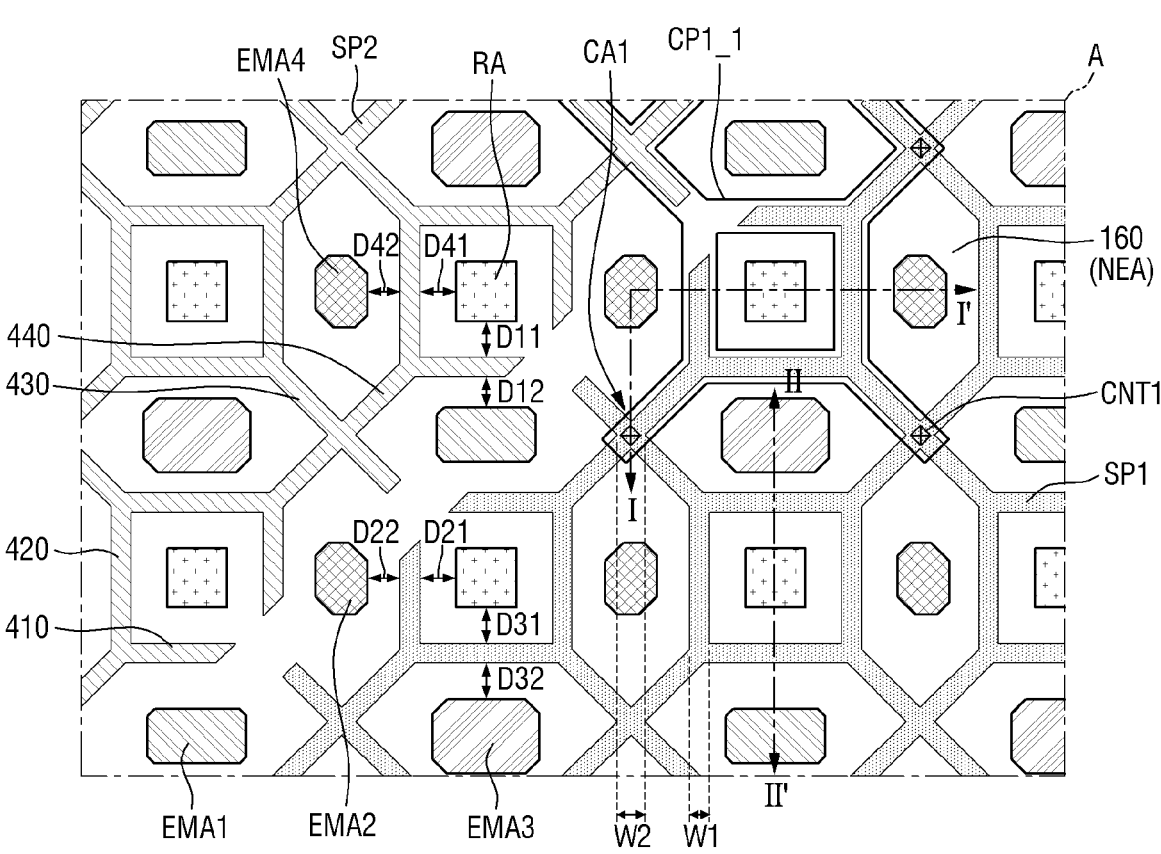
FIG. 7 is an enlarged view illustrating area A of FIG. 6 in detail.
Figure 7:
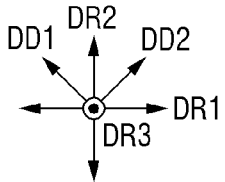

FIG. 7 is an enlarged view illustrating area A of FIG. 6 in detail.

FIG. 7 illustrates a portion of one first connection portion CP1_1, one first sensor portion SP1, and one second sensor portion SP2, but the same may be applied to the other first connection portion CP1_2.

The electrode pattern MP may include the first contact area CA1 connecting the first to fourth electrode lines 410, 420, 430, and 440 spaced apart from each other. The first contact area CA1 may be an area that connects the first sensor portion SP1 to the first connection portion CP1_1 through the first contact hole CNT1.

In the present embodiment, each of the first contact areas CA1 might not be disposed between the light sensing unit RA and the plurality of light emitting units EMA1, EMA2, EMA3, and EMA4 adjacent to each other. For example, the first contact area CA1 might not be disposed on the first electrode lines 410 or the second electrode lines 420 surrounding the light sensing unit RA.

For example, each of the first contact areas CA1 may be disposed between the first light emitting unit EMA1 and the third light emitting unit EMA3 alternately arranged in the first direction DR1. Each of the first contact areas CA1 may be disposed between the second light emitting unit EMA2 and the fourth light emitting unit EMA4 alternately arranged in the second direction DR2. For example, the first contact area CA1 may be formed in a region where the third electrode line 430 and the fourth electrode line 440 intersect each other. The third electrode line 430 and the fourth electrode line 440 are disposed to surround the first light emitting unit EMA1, the second light emitting unit EMA2, the third light emitting unit EMA3, and the fourth light emitting unit EMA4 that are adjacent.

Accordingly, a second width W2 of the first contact area CA1 in one direction may be greater than a first width W1 of the electrode pattern MP in one direction not disposed in the first contact area CA1. For example, the second width W2 of the first contact area CA1 may be greater than the first width W1 of each of the first to fourth electrode lines 410, 420, 430, and 440. One direction may be the first direction DR1, the second direction DR2, the first diagonal direction DD1, or the second diagonal direction DD2. For example, the second width W2 may have about 12 μm, and the first width W1 may have about 4 μm. For example, the first contact area CA1 may have a sufficient width to form the first contact hole CNT1.

In the present embodiment, the plurality of light sensing units RA may be disposed between the plurality of light emitting units EMA1, EMA2, EMA3, and EMA4, and thus the minimum distance between the light sensing unit RA and the light emitting units EMA1, EMA2, EMA3, and EMA4 that are adjacent may be smaller than the minimum distance among the light emitting units EMA1, EMA2, EMA3, and EMA4. Accordingly, since the first contact area CA1 may be disposed on the electrode pattern MP having a sufficient width to form the first contact hole CNT1, the first contact area CA1 might not be disposed on the first electrode lines 410 and the second electrode lines 420 surrounding the plurality of light sensing units RA.

In one direction, a first distance D11 between the light sensing unit RA and the electrode pattern MP may be the same as a second distance D12 between the first light emitting unit EMA1 adjacent to the light sensing unit RA and the electrode pattern MP. A first distance D21 between the light sensing unit RA and the electrode pattern MP may be the same as a second distance D22 between the second light emitting unit EMA2 adjacent to the light sensing unit RA and the electrode pattern MP. A first distance D31 between the light sensing unit RA and the electrode pattern MP may be the same as a second distance D32 between the third light emitting unit EMA3 adjacent to the light sensing unit RA and the electrode pattern MP. A first distance D41 between the light sensing unit RA and the electrode pattern MP may be the same as to a second distance D42 between the fourth light emitting unit EMA4 adjacent to the light sensing unit RA and the electrode pattern MP.

For example, the center of the first electrode line 410 disposed between the light sensing unit RA and the first light emitting unit EMA1 may coincide with the center of the peripheral portion NEA (or the pixel defining layer 160) dividing the light sensing unit RA and the first light emitting unit EMAL. Accordingly, a ratio of light emitted from the light emitting units EMA1, EMA2, EMA3, and EMA4 and reflected by the electrode pattern MP may be constant. In the above example, the same may also be applied to the second electrode line 420 disposed between the light sensing unit RA and the second light emitting unit EMA2, the first electrode line 410 disposed between the light sensing unit RA and the third light emitting unit EMA3, and the second electrode line 420 disposed between the light sensing unit RA and the fourth light emitting unit EMA4.

However, the present disclosure is not necessarily limited thereto, and the first distances D11, D21, D31, and 1D41 may also be different from the second distances D12, D22, D32, and D42. For example, the electrode pattern MP disposed between the light sensing unit RA and the light emitting units EMA1, EMA2, EMA3, and EMA4 may be different from the center of the peripheral portion NEA (or the pixel defining layer 160).

In the present embodiment, one first connection portion CP1 is illustrated as connecting the first sensor portion SP1 through the three first contact holes CNT1, but the number of the first contact holes CNT1 is not necessarily limited thereto. For example, the number of the first contact holes CNT1 may be four or more, and accordingly, the first sensor portion SP1 and the first connection portion CP1 may be more stably connected.

Figure 9:
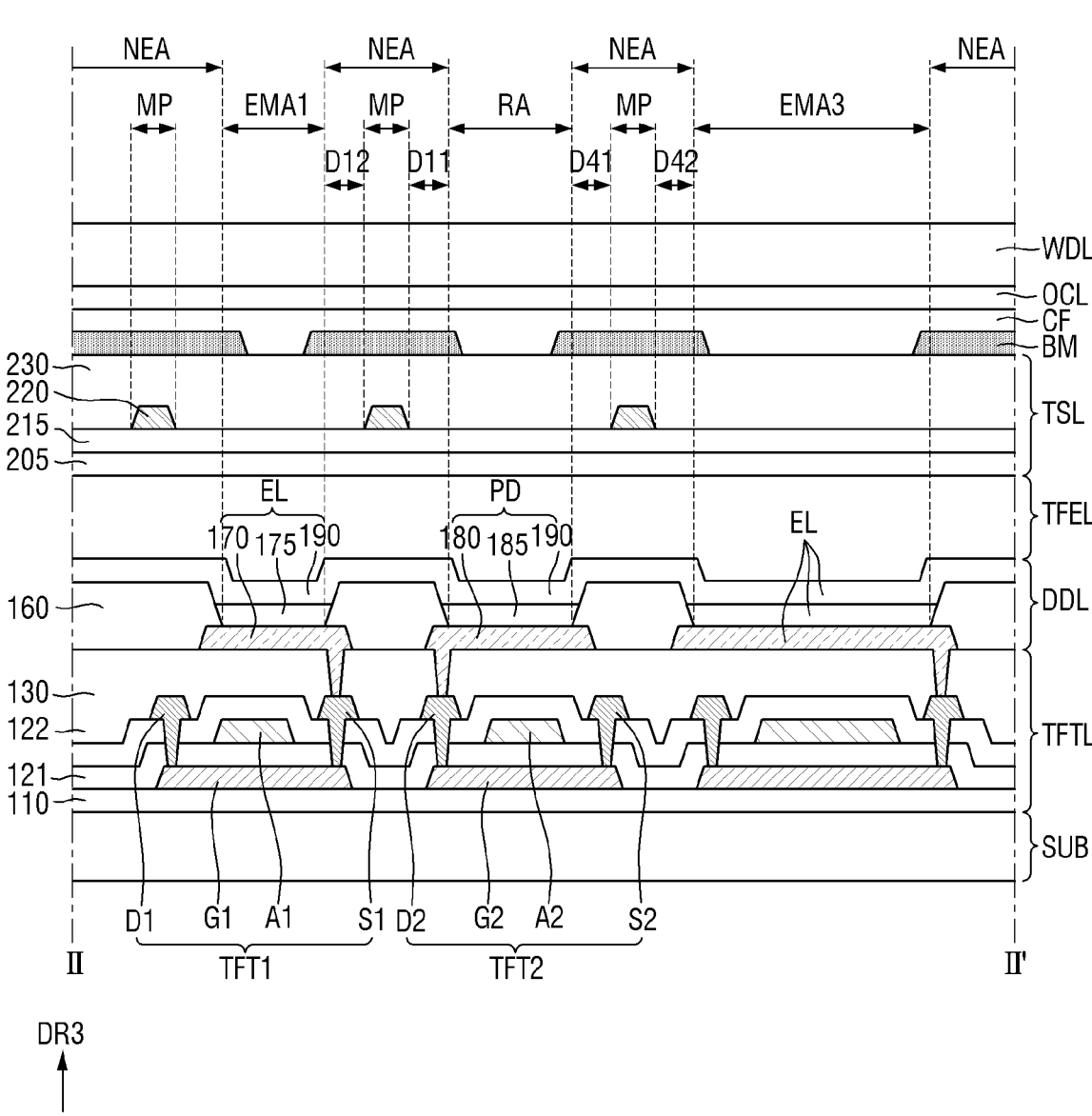
FIG. 9 is a cross-sectional view illustrating an example of the display device taken along line II-II' of FIG. 7.

FIG. 8 is a cross-sectional view illustrating an example of the display device taken along line I-I' of FIG. 7. FIG. 9 is a cross-sectional view illustrating an example of the display device taken along line II-II' of FIG. 7.

The display device 1_1 may include the substrate SUB, and a thin film transistor layer TFTL, a light emitting element layer DDL, the encapsulation layer TFEL, the touch sensing layer TSL, and the window WDL may be sequentially formed on the substrate SUB.

The substrate SUB may be a rigid substrate or a flexible substrate which can be bent, folded or rolled. The substrate SUB may be formed of an insulating material such as glass, quartz, or a polymer resin.

A buffer layer 110 may be disposed on one surface of the substrate SUB. The buffer layer 110 may include silicon nitride, silicon oxide, silicon oxynitride, or the like.

The thin film transistor layer TFTL disposed on the buffer layer 110 may include a first thin film transistor TFT1 and a second thin film transistor TFT2. The first thin film transistor TFT1 may be one of the driving transistor DT or the first to sixth transistors T1 to T6 of FIG. 4. The second thin film transistor TFT2 may be one of the first to third sensing transistors LT1 to LT3 of FIG. 4.

The plurality of thin film transistors TFT1 and TFT2 may include semiconductor layers A1 and A2, a gate insulating layer 121 disposed on a portion of the semiconductor layers A1 and A2, gate electrodes G1 and G2 on the gate insulating layer 121, an interlayer insulating layer 122 covering each of the semiconductor layers A1 and A2 and each of the gate electrodes G1 and G2, and source electrodes S1 and S2 and drain electrodes D1 and D2 on the interlayer insulating layer 122, respectively.

The semiconductor layers A1 and A2 may form channels of the first thin film transistor TFT1 and the second thin film transistor TFT2, respectively. The semiconductor layers A1 and A2 may include polycrystalline silicon. In an embodiment, the semiconductor layers A1 and A2 may include monocrystalline silicon, low-temperature polycrystalline silicon, amorphous silicon, or an oxide semiconductor. The oxide semiconductor may include, for example, a binary compound (ABx), a ternary compound (ABxCy), or a quaternary compound (ABxCyDz) including indium, zinc, gallium, tin, titanium, aluminum, hafnium (Hf), zirconium (Zr), magnesium (Mg) and the like. Each of the semiconductor layers A1 and A2 may include a channel region and a source region and a drain region doped with impurities.

The gate insulating layer 121 is disposed on the semiconductor layers A1 and A2. The gate insulating layer 121 electrically insulates the first gate electrode G1 from the first semiconductor layer A1 and electrically insulates the second gate electrode G2 and the second semiconductor layer A2. The gate insulating layer 121 may be made of an insulating material, for example, silicon oxide (SiOx), silicon nitride (SiNx), metal oxide, or the like.

The first gate electrode G1 of the first thin film transistor TFT1 and the second gate electrode G2 of the second thin film transistor TFT2 are disposed on the gate insulating layer 121.

The gate electrodes G1 and G2 may be formed on top of the channel region of the semiconductor layers A1 and A2, for example, on the gate insulating layer 121, respectively, at a position overlapping the channel region.

The interlayer insulating layer 122 may be disposed on the gate electrodes G1 and G2. The interlayer insulating layer 122 may include an inorganic insulating material such as silicon oxide (SiOx), silicon nitride (SiNx), silicon oxynitride, hafnium oxide, aluminum oxide, or the like. The interlayer insulating layer 122 may include a plurality of insulating layers, and may further include a conductive layer forming a second capacitor electrode between the insulating layers.

The source electrodes S1 and S2 and the drain electrodes D1 and D2 are disposed on the interlayer insulating layer 122. The first source electrode S1 of the first thin film transistor TFT1 may be electrically connected to the drain region of the first semiconductor layer A1 through a contact hole penetrating the interlayer insulating layer 122 and the gate insulating layer 121. The second source electrode S2 of the second thin film transistor TFT2 may be electrically connected to the drain region of the second semiconductor layer A2 through a contact hole penetrating the interlayer insulating layer 122 and the gate insulating layer 121. Each of the source electrodes S1 and S2 and the drain electrodes D1 and D2 may include metal such as aluminum (Al), molybdenum (Mo), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W) and/or copper (Cu).

A planarization layer 130 may be formed on the interlayer insulating layer 122 and may cover each of the source electrodes S1 and S2 and the drain electrodes D1 and D2. The planarization layer 130 may be formed of an organic insulating material or the like. The planarization layer 130 may have a flat surface and may include a contact hole exposing one of the source electrodes S1 and S2 and the drain electrodes D1 and D2.

The light emitting element layer DDL may be disposed on the planarization layer 130. The light emitting element layer DDL may include the light emitting element EL, the photoelectric conversion element PD, and the pixel defining layer 160. The light emitting element EL may include the pixel electrode 170, the light emitting layer 175, and the common electrode 190, and the photoelectric conversion element PD may include the first electrode 180, the photoelectric conversion layer 185, and the common electrode 190. The light emitting elements EL and the photoelectric conversion elements PD may share the common electrode 190.

The pixel electrode 170 of the light emitting element EL may be disposed on the planarization layer 130. The pixel electrode 170 may be provided for each pixel PX. The pixel electrode 170 may be connected to the first source electrode S1 or the first drain electrode D1 of the first thin film transistor TFT1 through a contact hole passing through the planarization layer 130.

The pixel electrode 170 of the light emitting element EL may have a single-layer structure of molybdenum (Mo), titanium (Ti), copper (Cu) or aluminum (Al), or may have a stacked-layer structure, for example, multiple layers of ITO/Mg, ITO/MgF, ITO/Ag, and ITO/Ag/ITO including indium-tin-oxide (ITO), indium-zinc-oxide (IZO), zinc oxide (ZnO), indium oxide (In2O3) and silver (Ag), magnesium (Mg), aluminum (Al), platinum (Pt), lead (Pb), gold (Au), or nickel (Ni), but is not necessarily limited thereto.

In addition, the first electrode 180 of the photoelectric conversion element PD may be disposed on the planarization layer 130. The first electrode 180 may be provided for each optical sensor PS. The first electrode 180 may be connected to the second source electrode S2 or the second drain electrode D2 of the second thin film transistor TFT2 through a contact hole passing through the planarization layer 130.

The first electrode 180 of the photoelectric conversion element PD is not necessarily limited thereto, but may have a single-layer structure of molybdenum (Mo), titanium (Ti), copper (Cu), or aluminum (Al), or may have a multilayer structure of ITO/Mg, ITO/MgF, ITO/Ag, and ITO/Ag/ITO.

The pixel defining layer 160 may be disposed on the pixel electrode 170 and the first electrode 180. The pixel defining layer 160 may be formed in an area overlapping the pixel electrode 170 to form an opening exposing the pixel electrode 170. An area in which the exposed pixel electrode 170 and the light emitting layer 175 overlap may be defined as the first to fourth light emitting units EMA1, EMA2, EMA3, and EMA4 of each pixel PX.

In addition, the pixel defining layer 160 may be formed in an area overlapping the first electrode 180 to form an opening exposing the first electrode 180. The opening exposing the first electrode 180 may provide a space in which the photoelectric conversion layer 185 of each optical sensor PS is formed, and the area in which the exposed first electrode 180 and the photoelectric conversion layer 185 overlap may be defined as the light sensing unit RA.

The pixel defining layer 160 may include an organic insulating material such as acrylic resin, epoxy resin, phenolic resin, polyamide resin, polyimide resin, unsaturated polyester resin, polyphenylene resin, polyphenylenesulfide resin or benzocyclobutene (BCB). For example, the pixel defining layer 160 may also include an inorganic material such as silicon nitride.

The light emitting layer 175 may be disposed on the pixel electrode 170 of the light emitting element EL exposed by the opening of the pixel defining layer 160. The light emitting layer 175 may include a polymer material or a low molecular material, and may emit red, green, or blue light for each pixel PX. The light emitted from the light emitting layer 175 may contribute to image display or function as a light source incident on the optical sensor PS. For example, a light source having a green wavelength emitted from the second light emitting unit EMA2 or the fourth light emitting unit EMA4 may function as a light source incident to the light sensing unit RA of the optical sensor PS.

When the light emitting layer 175 is formed of an organic material, a hole injecting layer ill and a hole transporting layer ITL may be disposed on the lower portion of each light emitting layer 175 as a center, and an electron injecting layer EIL and an electron transporting layer ETL may be stacked on the upper portion thereof. The layers may be single-layered or multi-layered with organic materials.

The photoelectric conversion layer 185 may be disposed on the first electrode 180 of the photoelectric conversion element PD exposed by the opening of the pixel defining layer 160. The photoelectric conversion layer 185 may generate photocharges in proportion to incident light. The incident light may also be light emitted from the light emitting layer 175 and then reflected to enter the photoelectric conversion layer 185, or may also be light provided from the outside regardless of the light emitting layer 175. Electric charges generated and accumulated in the photoelectric conversion layer 185 may be converted into electrical signals required for sensing.

The photoelectric conversion layer 185 may include an electron donating material and an electron accepting material. The electron donating material may generate donor ions in response to light, and the electron accepting material may generate acceptor ions in response to light. When the photoelectric conversion layer 185 is formed of an organic material, the electron donating material may include a compound such as subphthalocyanine (SubPc) or dibutylphosphate (DBP), but is not necessarily limited thereto. The electron accepting material may include a compound such as fullerene, a fullerene derivative, or perylene diimide, but is not necessarily limited thereto.

Alternatively, when the photoelectric conversion layer 185 is formed of an inorganic material, the photoelectric conversion element PD may be a pn-type or pin-type pho-totransistor. For example, the photoelectric conversion layer 185 may have a structure in which an N-type semiconductor layer, an I-type semiconductor layer, and a P-type semiconductor layer are sequentially stacked.

When the photoelectric conversion layer 185 is formed of an organic material, the hole injecting layer HIL and the hole transporting layer HTL may be disposed on the lower portion of each photoelectric conversion layer 185 as a center, and the electron injecting layer ELL and the electron transporting layer ETL may be stacked on the upper portion thereof. The layers may be single-layered or multi-layered with organic materials.

The light sensing unit RA is not necessarily limited thereto, but may be an area receiving light having the same wavelength as the light emitted from the adjacent second light emitting unit EMA2 or the fourth light emitting unit EMA4 as a light source.

The common electrode 190 may be disposed on the light emitting layer 175, the photoelectric conversion layer 185, and the pixel defining layer 160. The common electrode 190 may be disposed over the entirety of the plurality of pixels PX and the plurality of optical sensors PS and may cover the light emitting layer 175, the photoelectric conversion layer 185, and the pixel defining layer 160. The common electrode 190 may include a conductive material having a low work function, for example, Li, Ca, LiF/Ca, LiF/Al, Al, Mg, Ag, Pt. Pd, Ni, Au Nd, Ir, Cr, BaF, Ba, or a compound or mixture thereof (e.g., a mixture of Ag and Mg, etc.). As used herein, the phrase "low work function" may refer to any material having a work function that is equal to or less than that of any of the above-listed examples. Alternatively, the common electrode 173 may include a transparent metal oxide, for example, indium-tin-oxide (ITO), indium-zinc-oxide (IZO), zinc oxide (ZnO) or the like.

The encapsulation layer TFEL may be disposed on the light emitting element layer DDL. The encapsulation layer TFEL may include at least one inorganic layer and one organic layer to protect each of the light emitting layer 175 and the photoelectric conversion layer 185 from permeation of oxygen or moisture or foreign matter such as dust. For example, the encapsulation layer TFEL may be formed in a structure in which a first inorganic layer, an organic layer, and a second inorganic layer are sequentially stacked. The first inorganic layer and the second inorganic layer may be formed as a multilayer in which one or more inorganic layers selected from a silicon nitride layer, a silicon oxynitride layer, a silicon oxide layer, a titanium oxide layer, and an aluminum oxide layer are alternately stacked. The organic layer may be an organic layer such as acrylic resin, epoxy resin, phenolic resin, polyamide resin, or polyimide resin.

The base layer 205, the first touch insulating layer 215, the second touch conductive layer 220, and the second touch insulating layer 230 of the touch sensing layer TSL may be sequentially disposed on the encapsulation layer TFEL.

A first touch conductive layer 210 is disposed on the base layer 205. The first touch conductive layer 210 is covered with the first touch insulating layer 215. The first touch insulating layer 215 insulates the first touch conductive layer 210 from the second touch conductive layer 220. The second touch conductive layer 220 is disposed on the first touch insulating layer 215. The second touch insulating layer 230 may cover the second touch conductive layer 220 to protect it.

The base layer 205 may include an inorganic insulating material. For example, the base layer 205 may include a silicon nitride layer, a silicon oxynitride layer, a silicon oxide layer, a titanium oxide layer, an aluminum oxide layer, or the like. The base layer 205 may also be an inorganic layer constituting the encapsulation layer TFEL.

Referring to FIGS. 8 and 9 in conjunction with FIG. 6, the first connection portion CP1 may be formed of the first touch conductive layer 210, and the first sensor portion SP1, the second sensor portion SP2, and the second connection portion CP2 may be formed of the first touch conductive layer 210 and the second touch conductive layer 220 positioned with the first touch insulating layer 215 interposed therebetween. Through such a structure, mutual insulation may be secured at a portion where the first touch electrode IE1 and the second touch electrode IE2 intersect. However, the present disclosure is not necessarily limited thereto, and the second connection portion CP2 may be formed of the first touch conductive layer 210, and the first sensor portion SP1, the first connection portion CP1, and the second sensor portion SP2 may also be formed of the second touch conductive layer 220.

Each of the first sensor portion SP1 of the first touch electrode IE1 and the second sensor portion SP2 of the second touch electrode IE2 may be formed of the electrode pattern MP having a mesh structure. In this case, the first touch conductive layer 210 and the second touch conductive layer 220 may be made of a low-resistance material such as aluminum (Al), molybdenum (Mo), gold (Au), titanium (Ti), nickel (Ni), and copper (Cu). As used herein, the phrase "low-resistance material" may mean any material having an electrical resistance that is equal to or lower than any of the above-listed materials.

The first touch insulating layer 215 and the second touch insulating layer 230 may include an inorganic insulating material or an organic insulating material. In an embodiment of the present disclosure, one of the first touch insulating layer 215 and the second touch insulating layer 230 may include an inorganic material, and the other may include an organic material.

The first touch insulating layer 215 may include the first contact hole CNT1. The first touch conductive layer 210

(e.g., the first connection portion CP1) and a portion of the second touch conductive layer 220 (e.g., the first sensor portion SP1) may be electrically connected through the first contact hole CNT1.

The second touch conductive layer 220 constituting the electrode pattern MP may be disposed on the peripheral portion NEA of the display panel. When the second touch conductive layer 220 is disposed on the peripheral portion NEA, although an opaque low-resistance metal is applied to the second touch conductive layer 220, light emission is not prevented, and it might not be visually recognized by the user. For example, the first touch conductive layer 210 and the second touch conductive layer 220 may overlap the pixel defining layer 160 in the third direction DR3.

The electrode pattern MP may include the first contact area CA1. The second width W2 of the first contact area CA1 may be greater than the first width W1 of the electrode pattern MP. In addition, the first distance D11 between the light sensing unit RA and the electrode pattern MP is the same as the second distance D12 between the first light emitting unit EMA1 and the electrode pattern MP, but is not necessarily limited thereto. The first distance D21 between the light sensing unit RA and the electrode pattern MP is the same as the second distance D22 between the second light emitting unit EMA2 and the electrode pattern MP. The first distance D31 between the light sensing unit RA and the electrode pattern MP is the same as the second distance D32 between the third light emitting unit EMA3 and the electrode pattern MP. The first distance D41 between the light sensing unit RA and the electrode pattern MP is the same as the second distance D42 between the fourth light emitting unit EMA4 and the electrode pattern MP. In addition, each of the electrode patterns MP may be disposed at the center of the pixel defining layer 160 defining the light sensing unit RA and each light emitting unit EMA.

A light blocking member BM may be disposed on the touch sensing layer TSL. The light blocking member BM may be covered by a color filter CF. The light blocking member BM may use a material that blocks light emitted from the light emitting unit EMA. Accordingly, the light blocking member BM may prevent color mixing between color pixels included in each pixel PX. The width of the opening of the light blocking member BM may be smaller than the width of the light emitting unit EMA or the light sensing unit RA.

The light blocking member BM and the color filter CF may be covered by the optical adhesive layer OCL. The optical adhesive layer OCL may be a material having excellent light transmittance. The optical adhesive layer OCL may planarize upper portions of the light blocking member BM and the color filter CF. The optical adhesive layer OCL may be made of an acrylic epoxy material, but is not necessarily limited thereto.

The window WDL may be disposed on the optical adhesive layer OCL. The window WDL may be a protection member disposed on the optical adhesive layer OCL to protect the configuration of the display device 1_1. The window WDL may be made of glass or plastic.

Hereinafter, a display device 1 . . . 2, according to an embodiment in which the first to fourth electrode lines 410, 420, 430, and 440 are modified, will be described with reference to FIGS. 10 to 15. The display device 12 of FIGS. 10 to 15 includes a plurality of spacers 165 disposed among the plurality of light emitting units EMA1, EMA2, EMA3, and EMA4.

Figure 10:
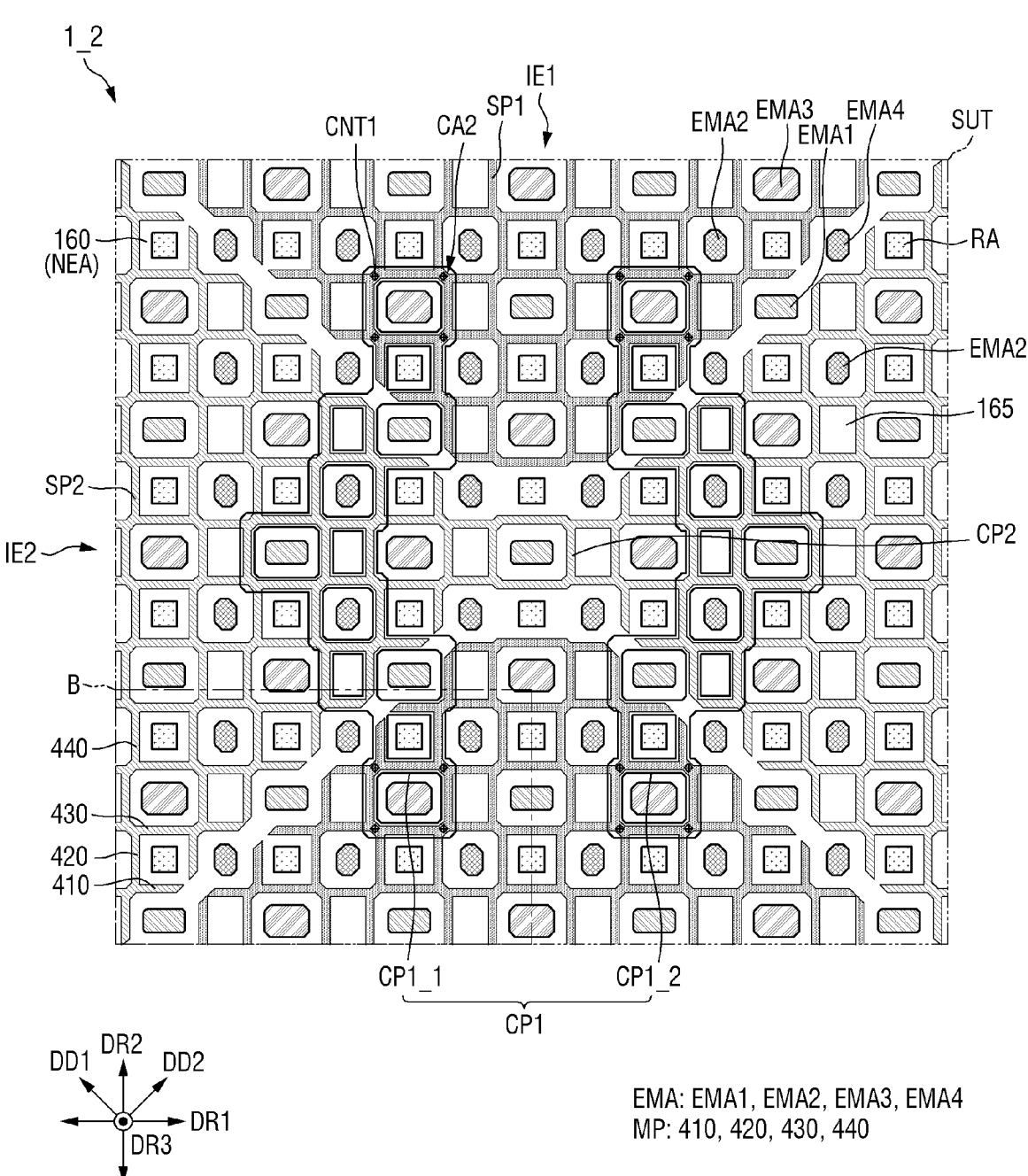
FIG. 10 is an enlarged view illustrating a pixel and an optical sensor of a display layer and touch electrodes of a touch sensing layer according to an embodiment of the present disclosure.

FIG. 10 is an enlarged view illustrating a pixel and an optical sensor of a display layer and touch electrodes of a touch sensing layer according to an embodiment.

Referring to FIG. 10, each of the plurality of spacers 165 may be disposed between the first light emitting unit EMA1 and the third light emitting unit EMA3 alternately arranged in the first direction DR), and may be disposed between the second light emitting unit EMA2 and the fourth light emitting unit EMA4 alternately arranged along the second direction DR2.

Each of the plurality of spacers 165 may be alternately arranged with the light sensing unit RA in the first diagonal direction DD1 and the second diagonal direction DD2.

Since the display device 1_2, according to the present embodiment, includes the plurality of spacers 165, a disposition structure of the electrode pattern MP may be different from that of the previous embodiment. For example, the electrode pattern MP surrounding the plurality of light sensing units RA has a quadrilateral planar shape as in the previous embodiment, but it is different from the previous embodiment in that the electrode pattern MP surrounding the plurality of light emitting units EMA1, EMA2, EMA3, and EM A4 has an octagonal planar shape.

The light sensing unit RA may be disposed in a mesh hole fonned by the first electrode lines 410 and the second electrode lines 420 that intersect. The two first electrode lines 410 and the two second electrode lines 420 surrounding the light sensing unit RA may have a quadrilateral planar shape. For example, the mesh hole in which the light sensing unit RA is disposed may have a quadrilateral planar shape.

The first to fourth light emitting units EMA1, EMA2, EMA3, and EMA4 may be disposed in the mesh holes formed by the first electrode lines 410, the second electrode lines 420, the third electrode lines 430, and the fourth electrode lines 440 that intersect. The two first electrode lines 410, the two second electrode lines 420, the two third electrode lines 430, and the two fourth electrode lines 440 surrounding each of the first to fourth light emitting units EMA1, EMA2, EMA3, and EMA4 may have an octagonal planar shape. For example, the mesh hole in which each of the first to fourth light emitting units EMA1, EMA2, EMA3, and EMA4 is disposed may have an octagonal planar shape.

The lengths of the first electrode lines 410 and the second electrode lines 420 in the extension direction may be longer than the lengths of the third electrode lines 430 and the fourth electrode lines 440 in the extension direction.

The spacer 165 may be disposed in a mesh hole formed by the first electrode lines 410 and the second electrode lines 420 that intersect. The two first electrode lines 410 and the two second electrode lines 420 surrounding the spacer 165 may have a quadrilateral planar shape. For example, the mesh hole in which the spacer 165 is disposed may have a quadrilateral planar shape.

The display device 1_2, according to the present embodiment, may include the plurality of light emitting units EMA1, EMA2, EMA3, and EMA4 and the plurality of light sensing units RA. The plurality of first touch electrodes IE1 and the plurality of second touch electrodes IE2 disposed on the plurality of light emitting units EMA1, EMA2, EMA3, and EMA4 and the plurality of light sensing units RA may have the electrode pattern MP of a mesh shape. Accordingly, since the plurality of first touch electrodes IE1 and the plurality of second touch electrodes IE2 do not overlap the plurality of light emitting units EMA1, EMA2, EMA3, and EMA4 and the plurality of light sensing units RA, the plurality of first touch electrodes IE1 and the plurality of second touch electrodes IE2 might not be visually recognized by the user, and external light may be stably incident on the light sensing unit RA.

Figure 11:
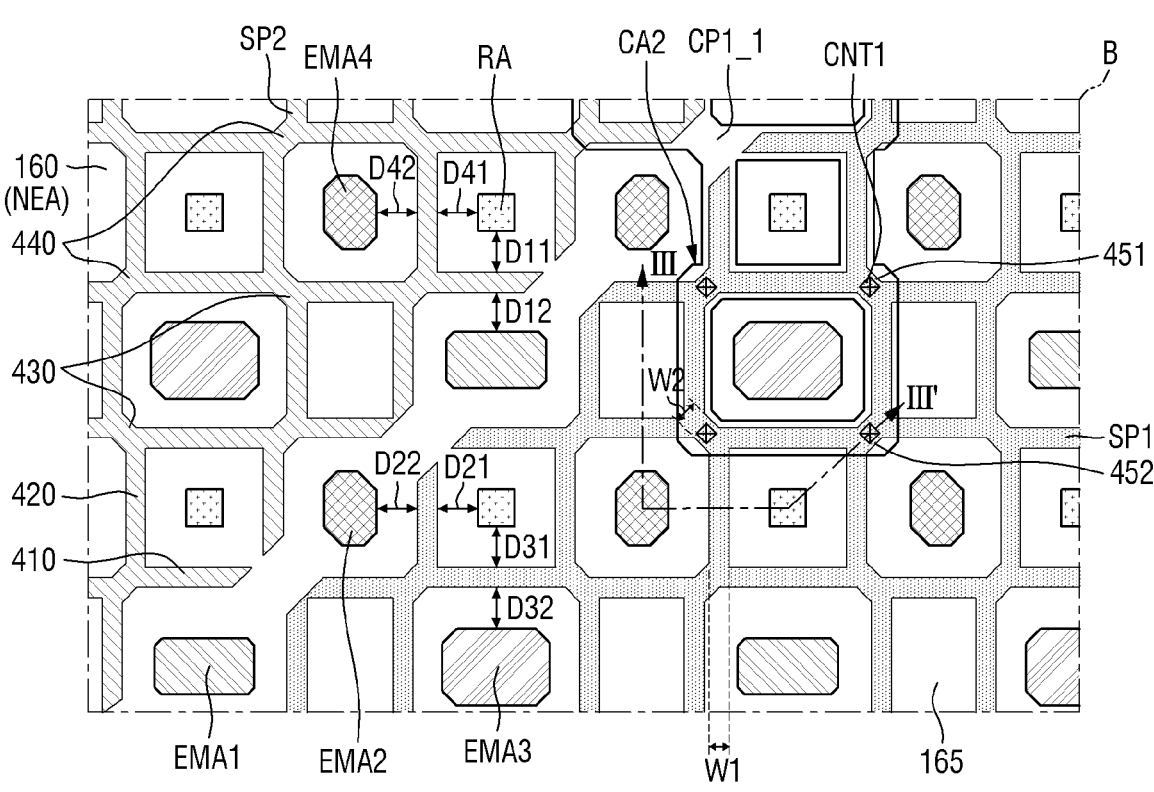
FIG. 11 is an enlarged view illustrating area B of FIG. 10 in detail according to an embodiment of the present disclosure.
Figure 11:
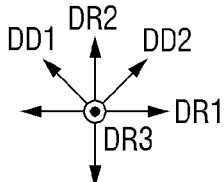
Figure 12:
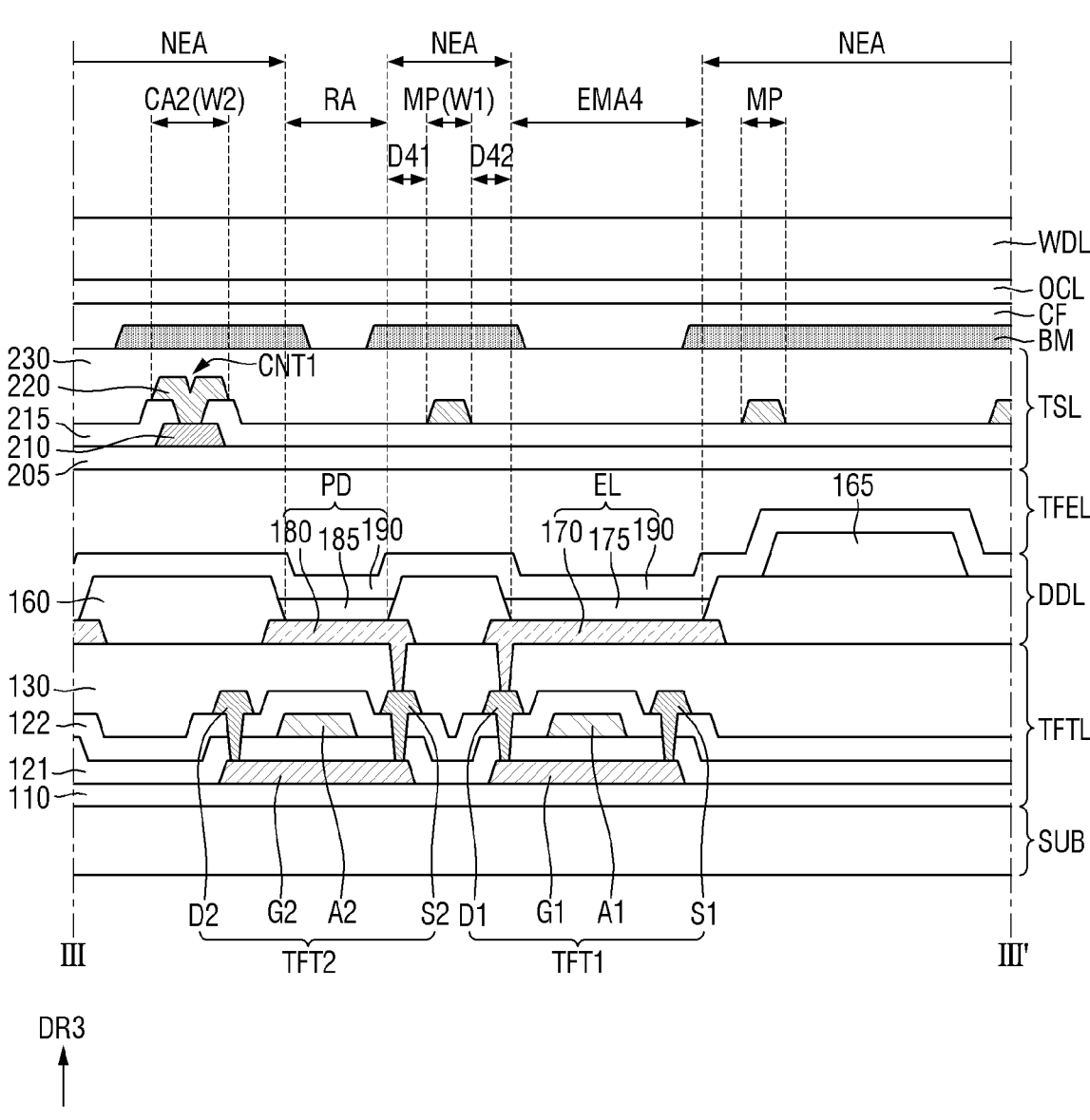
FIG. 12 is a cross-sectional view illustrating an example of the display device taken along line III-III' of FIG. 11.

FIG. 11 is an enlarged view illustrating area B of FIG. 10 in detail according to an embodiment of the present disclosure. FIG. 12 is a cross-sectional view illustrating an example of the display device taken along line III-III' of FIG. 11.

Referring to FIG. 11, in the display device 1_2, according to the present embodiment, the electrode pattern MP includes a plurality of second contact areas CA2 having a plurality of first contact holes CNT1, which is different from the first contact area CAL. Other than the fact that the second contact areas CA2 are not disposed on the first electrode lines 410 or the second electrode lines 420 surrounding the light sensing unit RA, the second contact areas CA2 may be the same as the first contact area CA1.

For example, each of the second contact areas CA2 may be disposed between the third light emitting unit EMA3 and the second light emitting unit EMA2 alternately arranged in the first diagonal direction DD1. Each of the second contact areas CA2 may be disposed between the third light emitting unit EMA3 and the fourth light emitting unit EMA4 alternately arranged in the second diagonal direction DD2. For example, the second contact area CA2 may be formed on a first connection electrode line 451 extending in the same first diagonal direction DD1 as the third electrode line 430, and may be formed on a second connection electrode line 452 extending in the same second diagonal direction DD2 as the fourth electrode line 440.

The electrode pattern MP may include the first connection electrode line 451 and a second connection electrode line 452 that form the second contact area CA2, and the first connection electrode line 451 and the second connection electrode line 452 may have sufficient widths to have the first contact holes CNT1. For example, the second width W2 of the second contact area CA2 may be greater than the first width W1 of the first to fourth electrode lines 410, 420, 430, and 440.

The first connection electrode line 451 and the second connection electrode line 452 may be physically connected to the first to fourth electrode lines 410, 420, 430, and 440 corresponding to the first sensor portion SP1. The first connection electrode line 451 and the second connection electrode line 452 may be connected to the first connection portion CP1_1 through the first contact hole CNT1.

Referring to FIG. 12, the spacer 165 is disposed on the pixel defining layer 160. The spacer 165 may be formed of the same material as the pixel defining layer 160, but is not necessarily limited thereto. The spacer 165 may be spaced apart from the photoelectric conversion element PD and the light emitting element EL. The area in which the spacer 165 is disposed may protrude in the third direction DR3 than the area in which the spacer 165 is not disposed. The common electrode 190 may be disposed on the spacer 165. The spacer 165 might not overlap the electrode pattern MP in the third direction DR3. The spacer 165 may be disposed on the peripheral portion NEA.

In the display device 1_2, according to the present embodiment, the first connection electrode line 451 and the second connection electrode line 452 having the second width W2 may be disposed in the second contact area CA2 to stably form the first contact hole CNT1.

Figure 13:
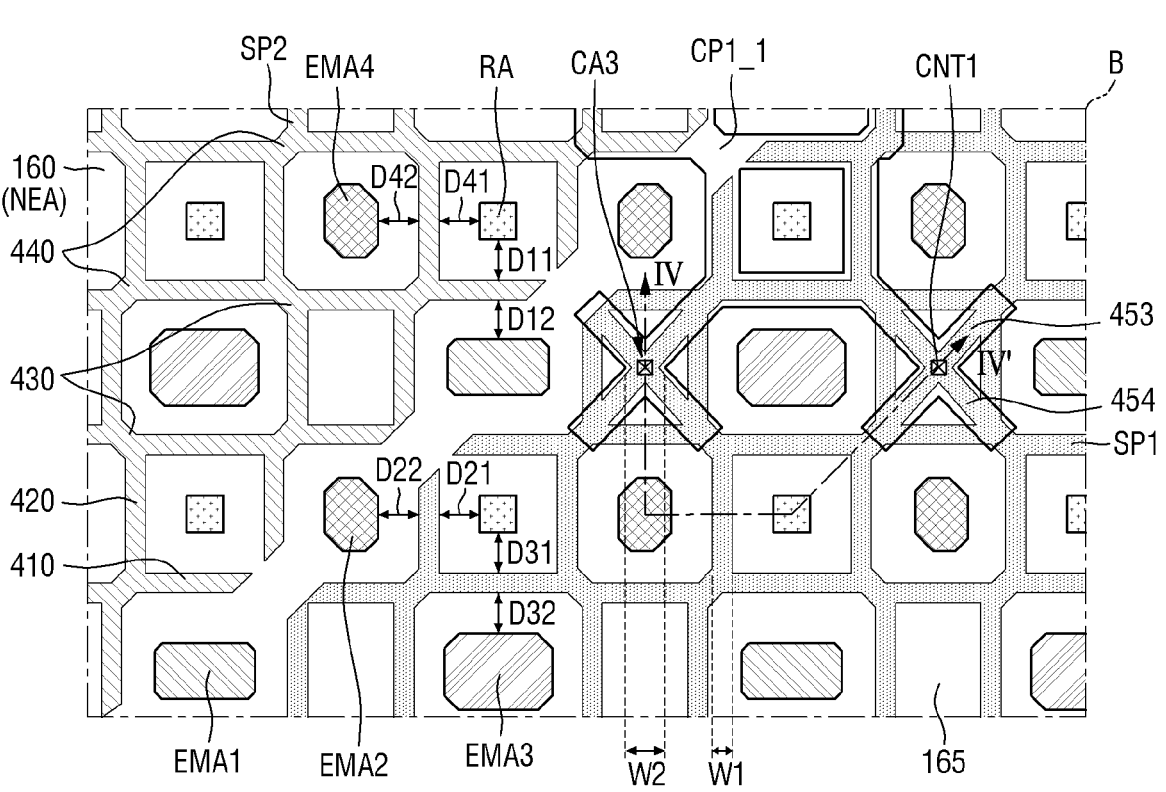
FIG. 13 is an enlarged view illustrating area B of FIG. 10 in detail according to an embodiment of the present disclosure.
Figure 13:
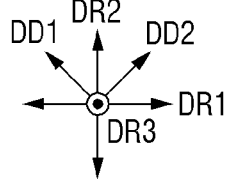
Figure 14:
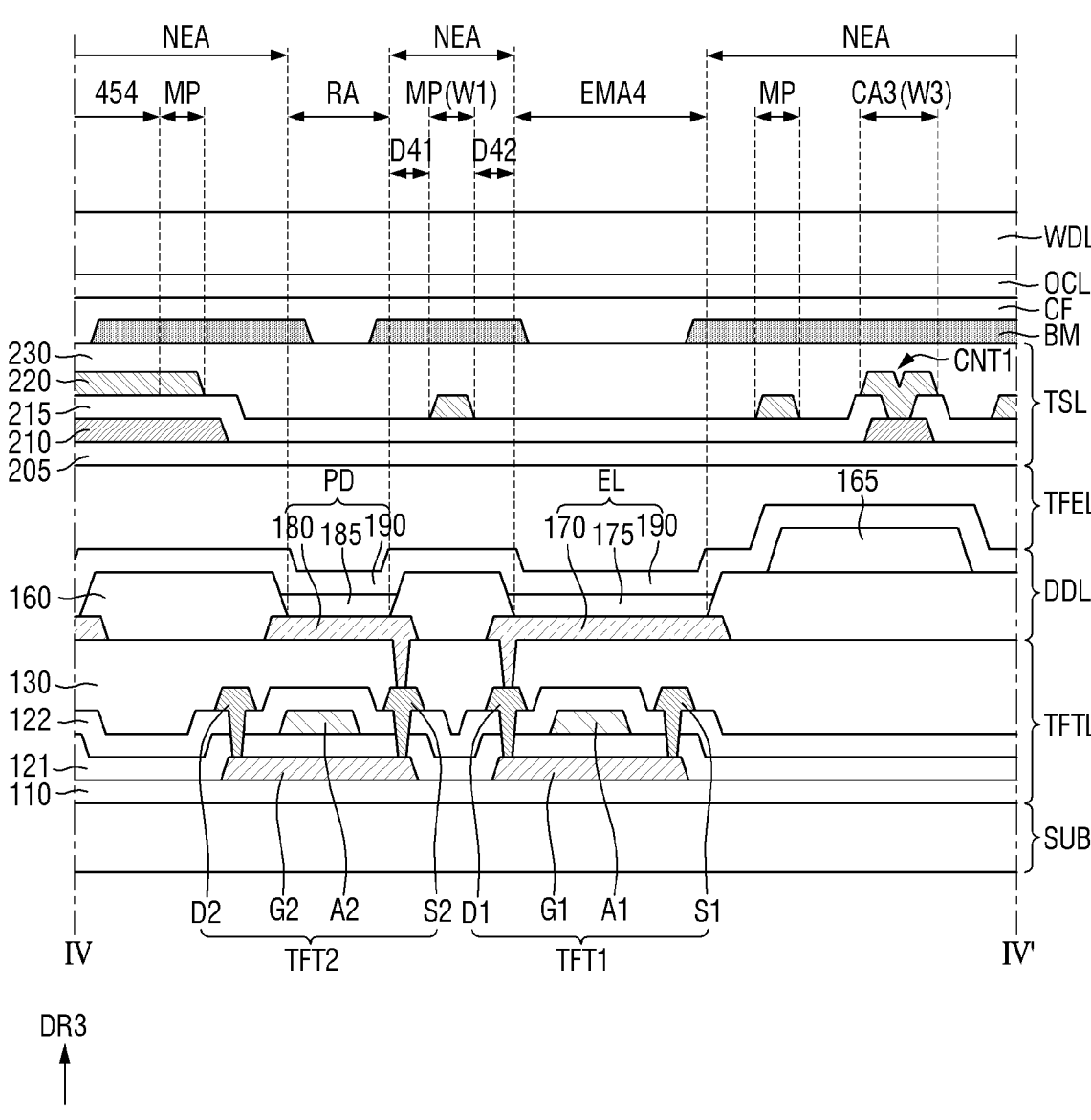
FIG. 14 is a cross-sectional view illustrating an example of the display device taken along line IV-IV' of FIG. 13.

FIG. 13 is an enlarged view illustrating area B of FIG. 10 in detail according to an embodiment. FIG. 14 is a cross-sectional view illustrating an example of the display device taken along line IV-IV' of FIG. 13. The display device 1_2 of FIGS. 13 and 14 includes a third contact area CA3 different from the second contact area CA2. Other than the fact that the third contact areas CA3 are not disposed on the first electrode lines 410 or the second electrode lines 420 surrounding the light sensing unit RA, the third contact areas CA3 may be the same as in the previous embodiments. The electrode pattern MP may include a third connection electrode line 453 extending in the same first diagonal direction DD1 as the third electrode line 430 and a fourth connection electrode line 454 extending in the same second diagonal direction DD2 as the fourth electrode line 440, and the third contact area CA3 may be formed in a region where the third connection electrode line 453 and the fourth connection electrode line 454 intersect.

For example, each of the third contact areas CA3 may be disposed between the first light emitting unit EMA1 and the third light emitting unit EMA3 alternately arranged in the first direction DR1. Each of the third contact areas CA3 may be disposed between the second light emitting unit EMA2 and the fourth light emitting unit EMA4 alternately arranged in the second direction DR2.

The third contact area CA3 may be formed in a region where a first connection electrode line 431 and a second connection electrode line 441 intersect, and include the first contact hole CNT1 connecting the first connection portion CP1_1 and the first sensor portions SP1. The second width W2 of the third contact area CA3 in one direction, in which the third connection electrode line 453 and the fourth connection electrode line 454 intersect, may be greater than the first width W1 of each of the first to fourth electrode lines 410, 420, 430, and 440 in one direction. For example, the third contact area CA3 may have a sufficient width to form the first contact hole CNT1. Accordingly, the third connection electrode line 453 and the fourth connection electrode line 454 may be further disposed in the third contact area CA3 to stably form the first contact hole CNT1.

The third connection electrode line 453 and the fourth connection electrode line 454 may be physically connected to the first to fourth electrode lines 410, 420, 430, and 440 corresponding to the first sensor portion SP1.

In cross-sectional view, the first touch conductive layer 210 and the second touch conductive layer 220 may further include the third connection electrode line 453 and the fourth connection electrode line 454. The third connection electrode line 453 and the fourth connection electrode line 454 may overlap the spacer 165 in the third direction DR3.

In the display device 1_2, according to the present embodiment, the third connection electrode line 453 and the fourth connection electrode line 454 may be further disposed in the third contact area CA3 to stably form the first contact hole CNT1.

Figure 15:
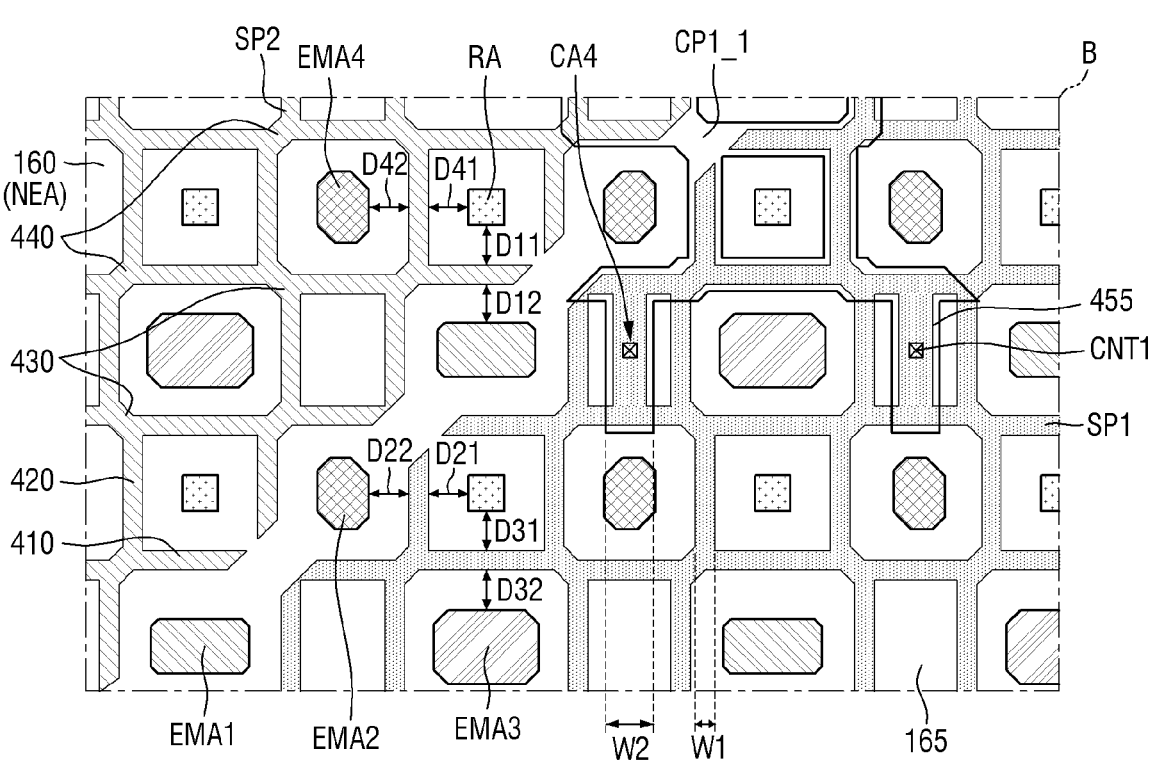
FIG. 15 is an enlarged view illustrating area B of FIG. 10 in detail according to an embodiment of the present disclosure.
Figure 15:
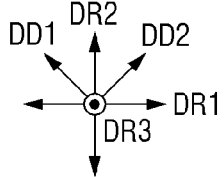

FIG. 15 is an enlarged view illustrating area B of FIG. 10 in detail according to an embodiment. The display device 1_2 of FIG. 15 includes a fourth contact area CA4 different from the third contact area CA3. Other than the fact that the fourth contact areas CA4 are not disposed on the first electrode lines 410 or the second electrode lines 420 surrounding the light sensing unit RA, the fourth contact areas CA4 may be the same as in the previous embodiments.

The electrode pattern MP may include a fifth connection electrode line 455 extending in the same second direction DR2 as the second electrode line 420, and the fourth contact area CA4 may be formed on the fifth connection electrode line 455 having the second width W2.

For example, each of the fourth contact areas CA4 may be disposed between the first light emitting unit EMA1 and the third light emitting unit EMA3 alternately arranged in the first direction DR1. Each of the fourth contact areas CA4 may be disposed between the second light emitting unit EMA2 and the fourth light emitting unit EMA4 alternately arranged in the second direction DR2.

The fourth contact area CA4 may connect the first connection portion CP1_1 and the first sensor portions SP1 through the first contact hole CNT1 disposed in the fifth connection electrode line 455. The second width W2 of the fifth connection electrode line 455 of the fourth contact area CA4 may be greater than the first width W1 of each of the first to fourth electrode lines 410, 420, 430, and 440 in one direction. For example, the fourth contact area CA4 may have a sufficient width to form the first contact hole CNT1. Accordingly, the fifth connection electrode line 455 may be further disposed in the fourth contact area CA4 to stably form the first contact hole CNT1.

The fifth connection electrode line 455 may physically connect the first electrode lines 410 that are spaced apart from each other, and may be disposed between the second electrode lines 420 spaced apart. The third connection electrode line 421 may overlap the spacer 165 in the third direction DR3.

In cross-sectional view, the first touch conductive layer and the second touch conductive layer may further include the fifth connection electrode line 455, and the fifth connection electrode line 455 may overlap the spacer 165 in the third direction DR3.

In the display device 1_2 of FIGS. 10 to 15, the first distances D11, D12, D13, and D14 between the light sensing unit RA and the electrode pattern MP may be the same as the second distances D12, D22, D32, and D42 between the first to fourth light emitting units EMA1, EMA2, EMA3, and EMA4 adjacent to the light sensing unit RA and the electrode pattern MP, respectively, but the present disclosure is not necessarily limited thereto. For example, the centers of the first to fourth electrode lines 410, 420, 430, and 440 disposed between the light sensing unit RA and the first to fourth light emitting units EMA1, EMA2, EMA3, and EMA4 may coincide with the center of the peripheral portion NEA (or the pixel defining layer 160) dividing the light sensing unit RA and the first to fourth light emitting units EMA1, EMA2, EMA3, and EMA4.

The display device 1_2, according to the present embodiment, may include the first to fifth connection electrode lines 451, 452, 453, 454, and 455 to more stably form the first contact hole CNT1 included in the second to fourth contact areas CA2, CA3, and CA4. For example, the widths of the second to fourth contact areas CA2, CA3, and CA4 in one direction may have the second width W2 that is sufficiently wide for the first contact hole CNT1 to be formed.

Although FIG. 10 is illustrated as including the second contact area CA2, FIG. 10 may be changed to fit the third contact area CA3 or the fourth contact area CA4.

Hereinafter, a display device 1_3, according to an embodiment in which the first to fourth electrode lines 410, 420, 430, and 440 are modified, will be described with reference to FIGS. 16 to 19.

Figure 16:
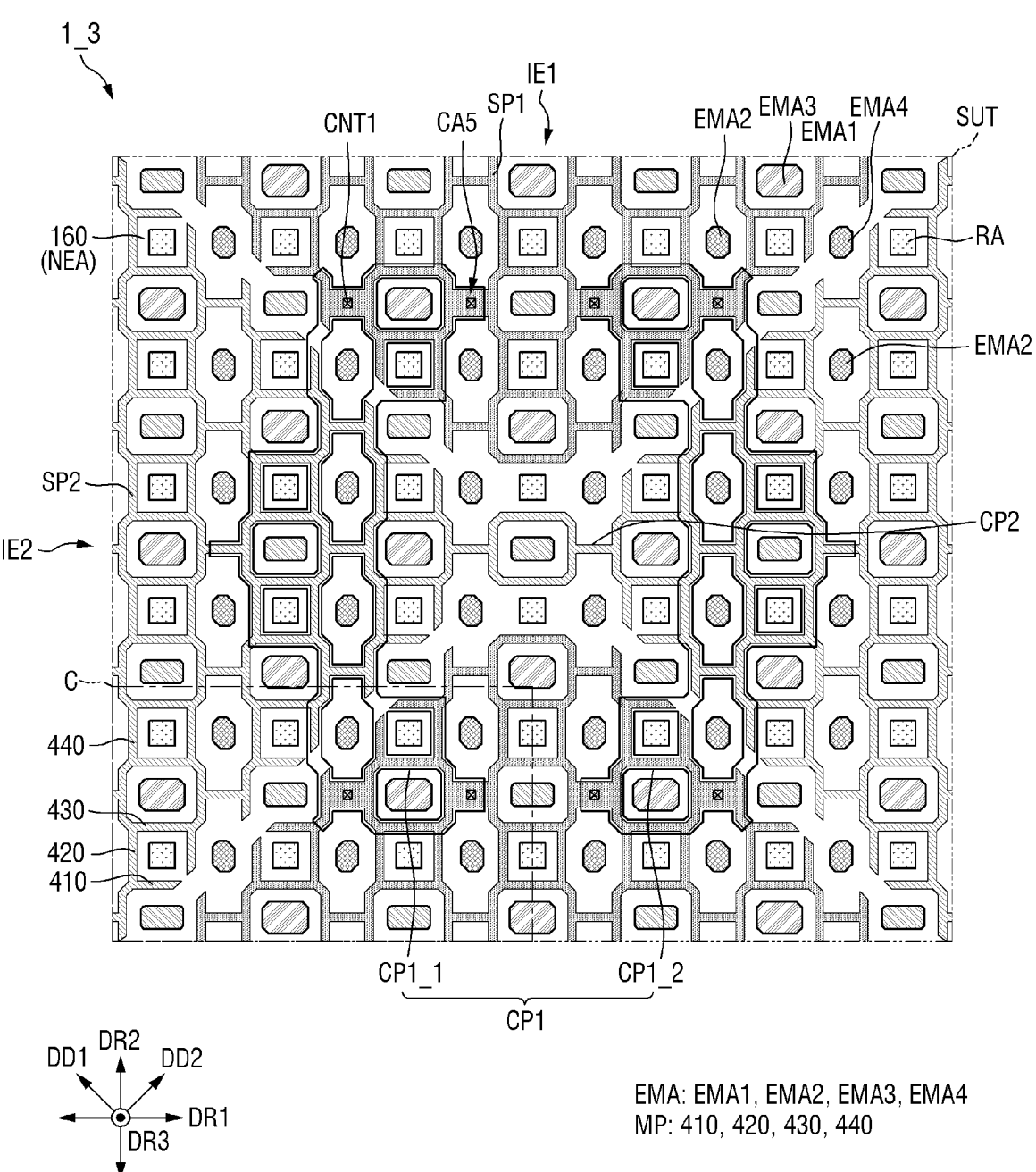
FIG. 16 is an enlarged view illustrating a pixel and an optical sensor of a display layer and touch electrodes of a touch sensing layer according to an embodiment of the present disclosure.
Figure 17:
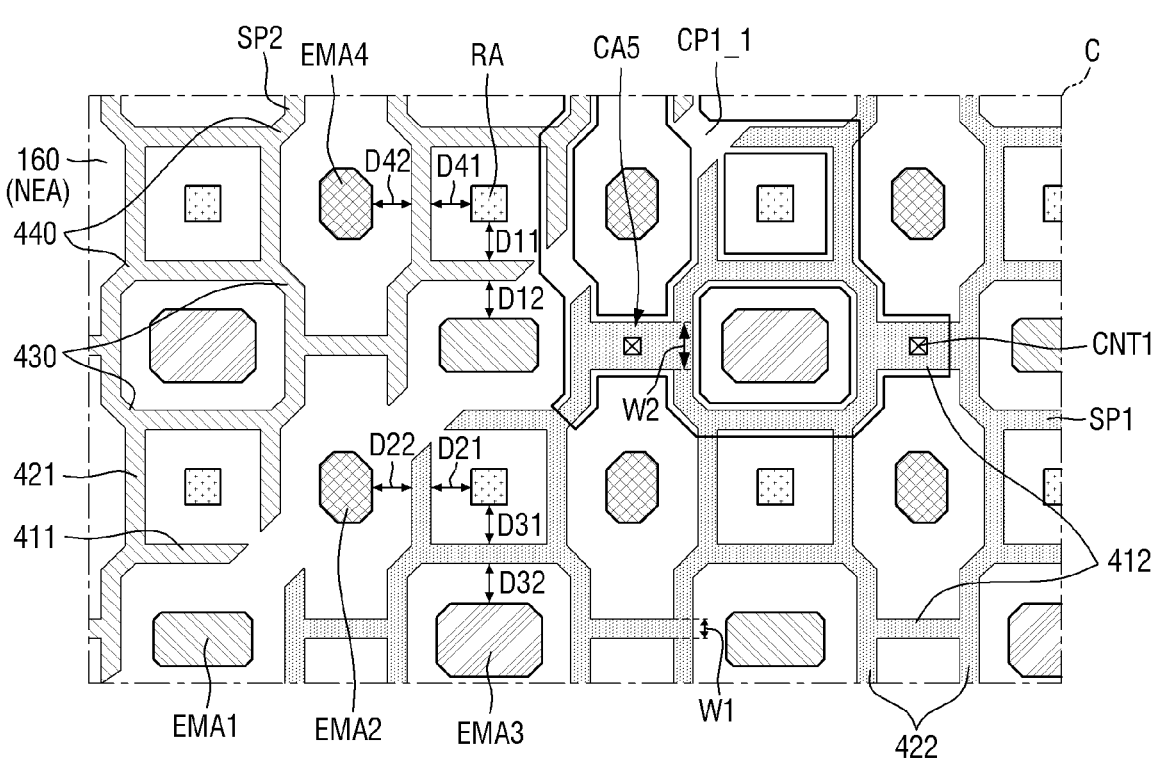
FIG. 17 is an enlarged view illustrating area C of FIG. 16 in the detail.
Figure 17:
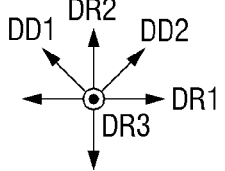

FIG. 16 is an enlarged view illustrating a pixel and an optical sensor of a display layer and touch electrodes of a touch sensing layer according to an embodiment. FIG. 17 is an enlarged view illustrating area C of FIG. 16 in the detail.

Referring to FIGS. 16 and 17, in the display device 1_3, according to the present embodiment, the electrode pattern MP surrounding the plurality of light sensing units RA has a quadrilateral planar shape as in the previous embodiment. The electrode pattern MP surrounding the first light emitting unit EMA1 and the third light emitting unit EMA3 may have an octagonal planar shape, and the electrode pattern MP surrounding the second light emitting unit EMA2 and the fourth light emitting unit EMA4 may have a dodecagonal planar shape. In addition, the display device 1_3 includes a fifth contact area CA5. The fifth contact areas CA5 might not be disposed on a first sub-electrode line 411 and a third sub-electrode line 421 surrounding the light sensing unit RA.

The first electrode line 410 may include the first sub-electrode line 411 disposed outside the light sensing unit RA, and the second sub-electrode line 412 disposed outside the second light emitting unit EMA2 or the fourth light emitting unit EMA4. The first sub-electrode line 411 and the second sub-electrode line 412 extend in the first direction DR1. The first sub-electrode line 411 is disposed between the light sensing unit RA and the first light emitting unit EMA1 adjacent in the second direction DR2 or is disposed between the light sensing unit RA and the third light emitting unit EMA3 adjacent in the second direction DR2. The second sub-electrode line 412 is disposed between the second light emitting unit EMA2 and the fourth light emitting unit EMA4 adjacent in the second direction DR2.

The second electrode line 420 may include the third sub-electrode line 421 disposed outside the light sensing unit RA, and a fourth sub-electrode line 422 disposed outside each of the first to fourth light emitting units EMA1, EMA2, EMA3, and EMA4. The third sub-electrode line 421 and the fourth sub-electrode line 422 extend in the second direction DR2. The third sub-electrode line 421 is disposed between the light sensing unit RA and the second light emitting unit EMA2 adjacent in the first direction DR1 or is disposed between the light sensing unit RA and the fourth light emitting unit EMA4 adjacent in the first direction DR1. The fourth sub-electrode line 422 is disposed between the first light emitting unit EMA1 and the third light emitting unit EMA3 adjacent in the first direction DR1.

The light sensing unit RA may be disposed in a mesh hole formed by the first sub-electrode lines 411 of the first electrode line 410 and the third sub-electrode lines 421 of the second electrode line 420 that intersect. For example, the two first sub-electrode lines 411 and the two third sub-electrode lines 421 surrounding the light sensing unit RA may have a quadrilateral planar shape. For example, the mesh hole in which the light sensing unit RA is disposed may have a quadrilateral planar shape.

The first light emitting unit EMA1 or the third light emitting unit EMA3 may be disposed in the mesh hole formed by the first sub-electrode lines 411, the third sub-electrode lines 421, the third electrode lines 430, and the fourth electrode lines 440 that intersect. The two first sub-electrode lines 411, the two third sub-electrode lines 421, the two third electrode lines 430, and the two fourth electrode lines 440 surrounding the first light emitting unit EMA1 or the third light emitting unit EMA3 may have an octagonal planar shape. For example, the mesh hole in which the first light emitting unit EMA1 or the third light emitting unit EMA3 is disposed may have an octagonal planar shape.

The second light emitting unit EMA2 or the fourth light emitting unit EMA4 may be disposed in the mesh hole formed by the second sub-electrode lines 412, the third sub-electrode lines 421, the fourth sub-electrode lines 422, the third electrode lines 430, and the fourth electrode lines 440 that intersect. The two second sub-electrode lines 412 surrounding the second light emitting unit EMA2 or the fourth light emitting unit EMA4, the two third sub-electrode lines 421, the four fourth sub-electrode lines 422, the two third electrode lines 430, and the two fourth electrode lines 440 may have a dodecagonal planar shape. For example, the mesh hole in which the second light emitting unit EMA2 or the fourth light emitting unit EMA4 is disposed may have a dodecagonal planar shape having two sides parallel to the first direction DR1.

In the present embodiment, the fifth contact areas CA5 might not be disposed on the first sub-electrode line 411 and the third sub-electrode line 421 surrounding the light sensing unit RA.

The fifth contact areas CA5 may be disposed on a portion of the second sub-electrode lines 412 disposed between the second light emitting unit EMA2 and the fourth light emitting unit EMA4. The fifth contact area CA5 may have the second width W2 to form the first contact hole CNT1. Accordingly, the second width W2 of the second sub-electrode line 412 in one direction disposed in the fifth contact area CA5 may be greater than the first width W1 of the other second sub-electrode line 412 in one direction not disposed in the fifth contact area CA5.

The display device 1_3, according to the present embodiment, may include the plurality of light emitting units EMA1, EMA2, EMA3, and EMA4 and the plurality of light sensing units RA, and the plurality of first touch electrodes IE1 and the plurality of second touch electrodes IE2 disposed on the plurality of light emitting units EMA1, EMA2, EMA3, and EMA4 and the plurality of light sensing units RA may have the electrode pattern MP of a mesh shape. Accordingly, since the plurality of first touch electrodes IE1 and the plurality of second touch electrodes IE2 do not overlap the plurality of light emitting units EMA1, EMA2, EMA3, and EMA4 and the plurality of light sensing units RA, the plurality of first touch electrodes IE1 and the plurality of second touch electrodes IE2 might not be visually recognized by the user, and external light may be stably incident on the light sensing unit RA.

Figure 18:
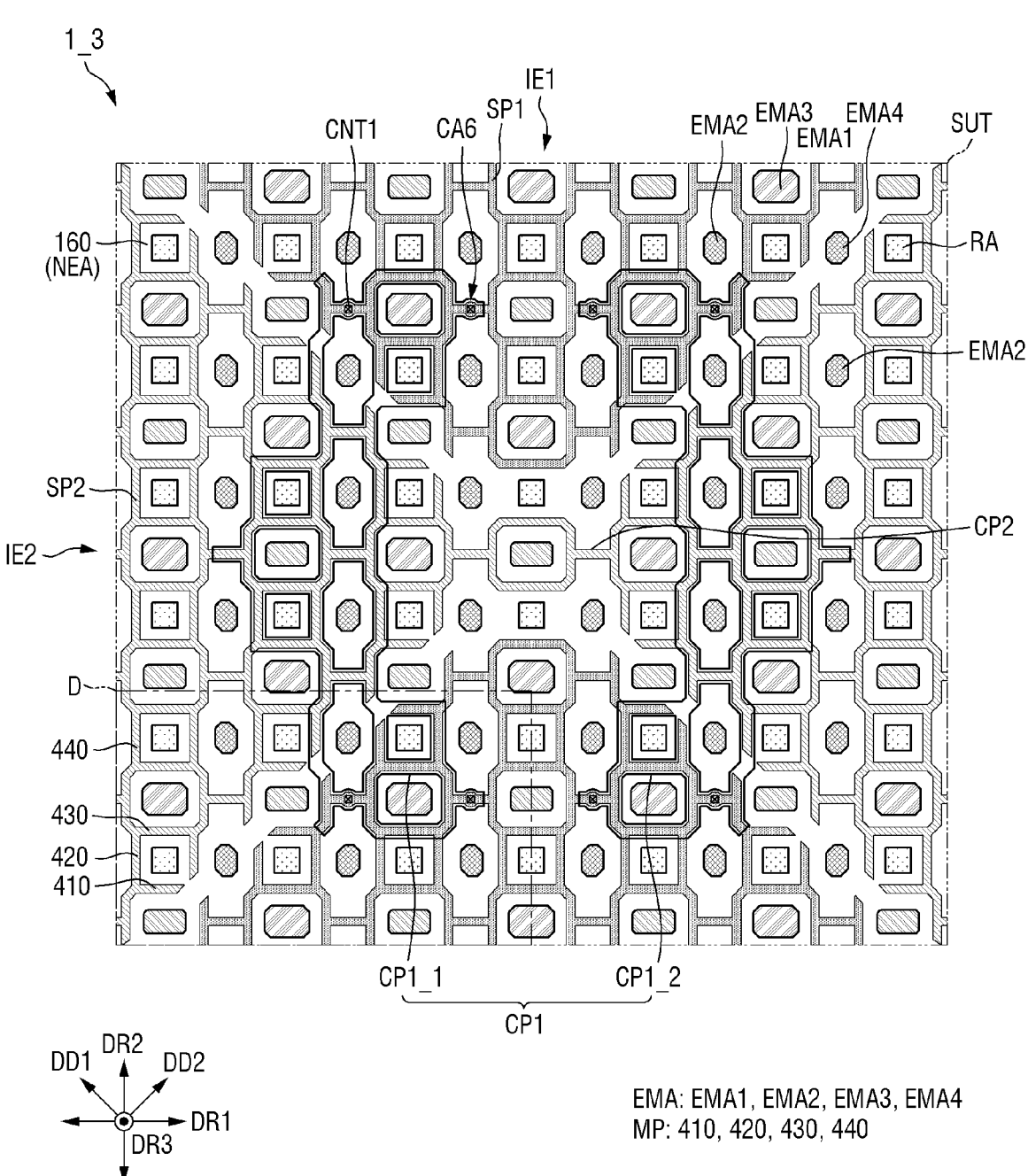
FIG. 18 is an enlarged view illustrating a pixel and an optical sensor of a display layer and touch electrodes of a touch sensing layer according to an embodiment of the present disclosure.
Figure 19:
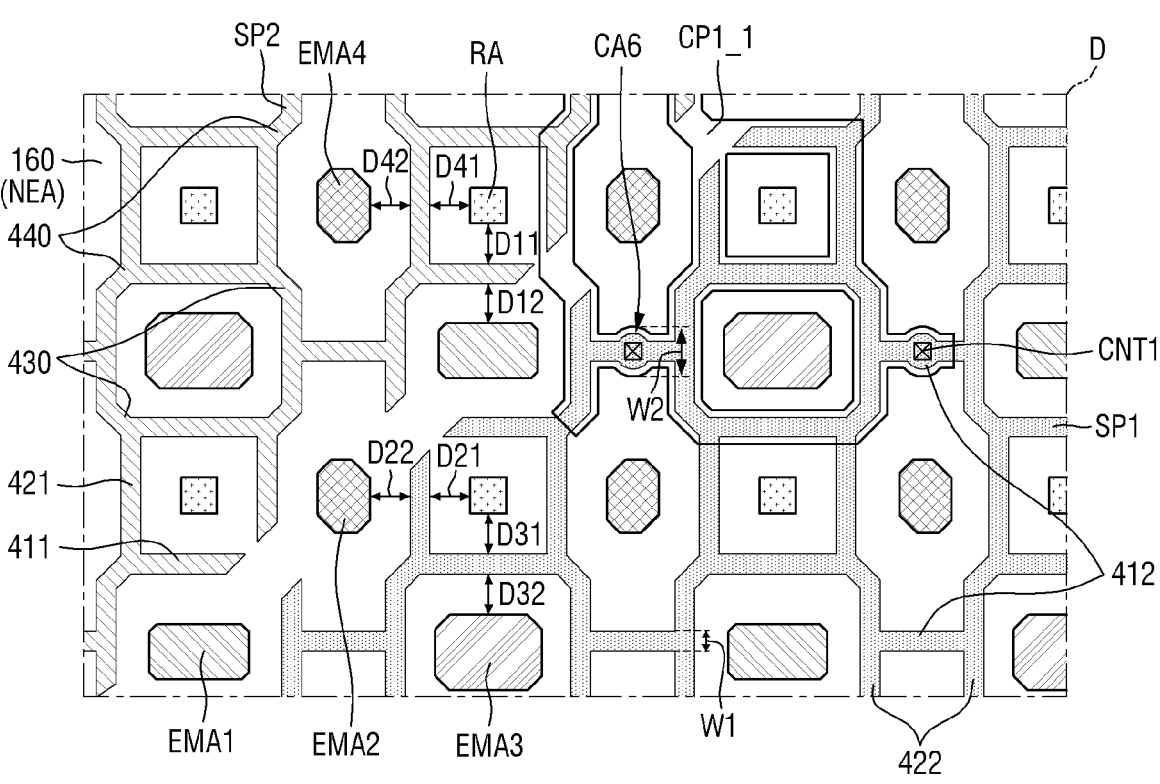
FIG. 19 is an enlarged view illustrating area D of FIG. 18 in detail.
Figure 19:
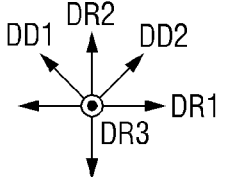

FIG. 18 is an enlarged view illustrating a pixel and an optical sensor of a display layer and touch electrodes of a touch sensing layer according to an embodiment. FIG. 19 is an enlarged view illustrating area D of FIG. 18 in detail. The display device 1 . . . 3 of FIGS. 18 and 19 is different from the embodiment of FIGS. 16 and 17 in that the display device 1_3 includes a sixth contact area CA6 different from the fifth contact area CA5. Other than the fact that the sixth contact area CA6 is not disposed on the first sub-electrode line 411 and the third sub-electrode line 421 surrounding the light sensing unit RA, the sixth contact area CA6 may be the same as in the previous embodiment.

For example, the sixth contact areas CA6 may be disposed on a portion of the second sub-electrode lines 412 disposed between the second light emitting unit EMA2 and the fourth light emitting unit EMA4. The sixth contact area CA6 may have the second width W2 to form the first contact hole CNT1. Accordingly, the second sub-electrode line 412 disposed in the sixth contact area CA6 may have the second width W2 only in the portion thereof forming the first contact hole CNT1. The second sub-electrode line 412 disposed in the sixth contact area CA6 may be an electrode pattern partially having a curved portion. The second width W2 of the second sub-electrode line 412 in one direction disposed in the sixth contact area CA6 may be greater than the first width W1 of the other second sub-electrode line 412 in one direction not disposed in the sixth contact area CA6.

In one direction, the first distances D11, D12, D13, and D14 between the light sensing unit RA and the electrode pattern MP may be the same as the second distances D12, D22, D32, and D42 between the first to fourth light emitting units EMA1, EMA2, EMA3, and EMA4 adjacent to the light sensing unit RA and the electrode pattern MP, respectively. For example, the centers of the first to fourth electrode lines 410, 420, 430, and 440 disposed between the light sensing unit RA and the first to fourth light emitting units EMA1, EMA2, EMA3, and EMA4 may coincide with the center of the peripheral portion NEA (or the pixel defining layer 160) dividing the light sensing unit RA and the first to fourth light emitting units EMA1, EMA2, EMA3, and EMA4.

The effects of the present invention are not necessarily limited by the foregoing.

Although embodiments of the present invention have been disclosed for illustrative purposes, those skilled in the art will appreciate that various modifications, additions and substitutions are possible, without departing from the scope and spirit of the present disclosure.

What is claimed is:

1. A display device, comprising:
   a substrate;
   a plurality of light emitting units disposed on the substrate;
   a plurality of light sensing units disposed on the substrate;
   a pixel defining layer partitioning the plurality of light emitting units and the plurality of light sensing units; and
   a touch electrode disposed on the pixel defining layer,
   wherein a shape of a mesh hole defined by the touch electrode and in which the plurality of light sensing units are disposed is defined by the touch electrode, and is different from a shape of a mesh hole in which a particular light emitting unit among the plurality of light emitting units is disposed,
   wherein a first distance between any one of the plurality of light sensing units and the touch electrode in one direction is equal to a second distance between the touch electrode and the particular light emitting unit, of the plurality of light emitting units, adjacent to the light sensing unit in the one direction,
   wherein the mesh hole in which each of the plurality of light sensing units is disposed has a rectangular planar shape, and the mesh hole in which each the plurality of light emitting units is disposed has a hexagonal planar shape,
   wherein the rectangular mesh hole of each of the plurality of light sensing units is surrounded on four sides thereof by four hexagonal mesh holes of four light emitting units of the plurality of light emitting units that are closest thereto, and
   wherein the rectangular mesh hole of the plurality of light sensing units combines with the hexagonal mesh holes of the four light emitting units to form an octagonal pixel unit in which the rectangular mesh hole of the plurality of light sensing units is at a center of.

2. The display device of claim 1, wherein a planar shape of the plurality of light sensing units is different from the shape of the mesh hole in which the plurality of light sensing units are disposed.

3. The display device of claim 1, wherein a planar shape of the particular light emitting unit among the plurality of light emitting units is different from the shape of the mesh hole in which the particular light emitting unit among the plurality of light emitting units is disposed.

4. The display device of claim 3, wherein a planar shape of the plurality of light sensing units is equal to the shape of the mesh hole in which the plurality of light sensing units are disposed.

5. The display device of claim 1, wherein:

the plurality of light emitting units comprise first light emitting units, second light emitting units, third light emitting units, and fourth light emitting units spaced apart from each other, the first light emitting units are alternately arranged with the third light emitting units in a first direction, and the second light emitting units are alternately arranged with the fourth light emitting units in a second direction intersecting the first direction, wherein the first light emitting units, the second light emitting units, and the third light emitting units may each emit light of a different color and the fourth light emitting units emits light of a same color as one of the first light emitting units, the second light emitting units, and the third light emitting units.

6. The display device of claim 5, wherein the light sensing unit is disposed between the first light emitting units and the third light emitting units adjacent in the second direction, and disposed between the second light emitting units and the fourth light emitting units adjacent in the first direction.

7. The display device of claim 1, wherein the particular light emitting unit comprises an anode electrode on the substrate, a cathode electrode on the pixel electrode and a light emitting layer disposed between the anode electrode and the cathode electrode, wherein each of the plurality of light sensing units comprises a first electrode on the substrate, a second electrode on the first electrode and a photoelectric conversion layer disposed between the second electrode and the first electrode, and wherein the cathode electrode and the second electrode are integrally formed as one body.

8. A display device, comprising:

a substrate;

a plurality of light emitting units disposed on the substrate;

a plurality of light sensing units disposed on the substrate;

a pixel defining layer partitioning the plurality of light emitting units and the plurality of light sensing units; and a touch electrode disposed on the pixel defining layer, wherein the touch electrode comprises first electrode lines extending in a first direction, second electrode lines extending in a second direction intersecting the first direction, third electrode lines extending in a first diagonal direction inclined with respect to the first direction, and fourth electrode lines extending in a second diagonal direction intersecting the first diagonal direction, wherein a first distance between any one of the plurality of light sensing units and the touch electrode in one direction is equal to a second distance between the touch electrode and a particular light emitting unit, of the plurality of light emitting units, adjacent to the light sensing unit in the one direction, wherein the touch electrode defines rectangular mesh holes surrounding each of the plurality of light emitting units and hexagonal mesh holes surrounding each of the plurality of light sensing units, wherein the rectangular mesh hole of each of the plurality of light sensing units is surrounded on four sides thereof by four hexagonal mesh holes of four light emitting units of the plurality of light emitting units that are closest thereto, and wherein the rectangular mesh hole of the plurality of light sensing units combines with the hexagonal mesh holes of the four light emitting units to form an octagonal pixel unit in which the rectangular mesh hole of the plurality of light sensing units is at a center of.

9. The display device of claim 8, wherein each of the plurality of light sensing units is at least partially surrounded by the first electrode lines and the second electrode lines.

10. The display device of claim 9, wherein:

a first particular light emitting unit among the plurality of light emitting units is at least partially surrounded by the first electrode lines, the third electrode lines, and the fourth electrode lines, and a second particular light emitting unit among the plurality of light emitting units is at least partially surrounded by the second electrode lines, the third electrode lines, and the fourth electrode lines.

11. The display device of claim 10, wherein the second particular light emitting unit among the plurality of light emitting units is at least partially surrounded by the first electrode lines, the second electrode lines, the third electrode lines, and the fourth electrode lines.

12. The display device of claim 8, further comprising:

a scan line connected to the plurality of light emitting units and applying a scan signal; and a data line connected to the plurality of light emitting units and applying a data voltage, wherein the scan line extends in the first direction, and the data line extends in the second direction.

13. The display device of claim 8, wherein the touch electrode comprises a plurality of first sensor portions and a first connection portion connecting the plurality of first sensor portions in contact areas, and wherein a width of each of the contact areas in one direction is greater than a width of the first electrode lines in one direction.

14. The display device of claim 8, wherein:

the plurality of light emitting units comprise first light emitting units, second light emitting units, third light emitting units, and fourth light emitting units spaced apart from each other, the first light emitting units are alternately arranged with the third light emitting units in a first direction, and the second light emitting units are alternately arranged with the fourth light emitting units in a second direction intersecting the first direction, wherein the first light emitting units, the second light emitting units, and the third light emitting units may each emit light of a different color and the fourth light emitting units emits light of a same color as one of the first light emitting units, the second light emitting units, and the third light emitting units.

15. The display device of claim 8, wherein:

each of the first electrode lines includes a first sub-electrode line at least partially surrounding each of the plurality of light sensing units and a second sub-electrode line at least partially surrounding any one of the plurality of light emitting units, and each of the second electrode lines comprises a third sub-electrode line at least partially surrounding each of the plurality of light sensing units and a fourth sub-electrode line at least partially surrounding another one of the plurality of light emitting units.

16. The display device of claim 8, wherein the particular light emitting unit comprises an anode electrode on the substrate, a cathode electrode on the pixel electrode and a light emitting layer disposed between the anode electrode and the cathode electrode, wherein each of the plurality of light sensing units comprises a first electrode on the substrate, a second electrode on the first electrode and a photoelectric conversion layer disposed between the second electrode and the first electrode, and wherein the cathode electrode and the second electrode are integrally formed as one body.

17. An electronic device, comprising:

a substrate;

a plurality of light emitting units disposed on the substrate;

a plurality of light sensing units disposed on the substrate;

a pixel defining layer partitioning the plurality of light emitting units and the plurality of light sensing units; and a plurality of first sensor portions disposed on the pixel defining layer and extending in one direction and a contact area connecting the plurality of first sensor portions, wherein the plurality of first sensor portions comprise a first electrode line disposed outside any one of the plurality of light sensing units and a second electrode line intersecting the first electrode line, wherein the contact area is not disposed on either the first electrode line or the second electrode line, wherein a first distance between any one of the plurality of light sensing units and the first sensor portions in one direction is equal to a second distance between the first sensor portions and a particular light emitting unit, of the plurality of light emitting units, adjacent to the light sensing unit in the one direction, wherein the first and second electrode lines define rectangular mesh holes surrounding each of the plurality of light emitting units and hexagonal mesh holes surrounding each of the plurality of light sensing units, wherein the rectangular mesh hole of each of the plurality of light sensing units is surrounded on four sides thereof by four hexagonal mesh holes of four light emitting units of the plurality of light emitting units that are closest thereto, and wherein the rectangular mesh hole of the plurality of light sensing units combines with the hexagonal mesh holes of the four light emitting units to form an octagonal pixel unit in which the rectangular mesh hole of the plurality of light sensing units is at a center of.

18. The electronic device of claim 17, wherein:

the plurality of first sensor portions further comprise a third electrode line and a fourth electrode line that intersect in different directions from the first electrode line and the second electrode line, and the contact area is formed in a region where the third electrode line and the fourth electrode line intersect.

19. The electronic device of claim 17, wherein:

each of the first electrode lines comprises a first sub-electrode line disposed outside any one of the plurality of light sensing units and a second sub-electrode line disposed outside any one of the plurality of light emitting units, each of the second electrode lines comprises a third sub-electrode line at least partially surrounding each of the plurality of light sensing units and a fourth sub-electrode line at least partially surrounding another one of the plurality of light emitting units, and the contact area is disposed on the second sub-electrode line.

20. The electronic device of claim 17, wherein a first width of one of the first electrode line and the second electrode line in one direction is smaller than a second width of the contact area in the one direction.

21. The electronic device of claim 17, wherein the particular light emitting unit comprises an anode electrode on the substrate, a cathode electrode on the pixel electrode and a light emitting layer disposed between the anode electrode and the cathode electrode, wherein each of the plurality of light sensing units comprises a first electrode on the substrate, a second electrode on the first electrode and a photoelectric conversion layer disposed between the second electrode and the first electrode, and wherein the cathode electrode and the second electrode are integrally formed as one body.

* * * * *